United States Patent
Raether et al.

(10) Patent No.: US 7,008,990 B2
(45) Date of Patent: *Mar. 7, 2006

(54) USE OF POLYMERIC REACTION PRODUCT

(75) Inventors: Roman Benedikt Raether, Limburgerhof (DE); Susanne Brinkmann-Rengel, Ober-Olm (DE); Sylke Haremza, Neckargemünd (DE)

(73) Assignee: Basf Aktiengesellschaft, Ludwigshafen (DE)

( * ) Notice: Subject to any disclaimer, the term of this patent is extended or adjusted under 35 U.S.C. 154(b) by 175 days.

This patent is subject to a terminal disclaimer.

(21) Appl. No.: 10/311,378

(22) PCT Filed: Jun. 13, 2001

(86) PCT No.: PCT/EP01/06712

§ 371 (c)(1),
(2), (4) Date: Apr. 21, 2003

(87) PCT Pub. No.: WO01/96408

PCT Pub. Date: Dec. 20, 2001

(65) Prior Publication Data

US 2003/0170306 A1 Sep. 11, 2003

(30) Foreign Application Priority Data

Jun. 16, 2000 (DE) ................ 100 29 694

(51) Int. Cl.
*C08K 3/20* (2006.01)
(52) U.S. Cl. .............. 524/457; 524/458; 525/64; 526/204
(58) Field of Classification Search ......... 524/457, 524/458; 525/64; 526/204
See application file for complete search history.

(56) References Cited

U.S. PATENT DOCUMENTS 6,156,858 A * 12/2000 Keoshkerian et al. ....... 526/204

FOREIGN PATENT DOCUMENTS

| CA | 2355252 | 6/2000 |
|---|---|---|
| CA | 2355620 | 7/2000 |
| DE | 198 58 708 | 6/2000 |
| DE | 198 60 011 | 6/2000 |
| DE | 199 09 752 | 9/2000 |
| DE | 199 30 067 | 1/2001 |
| DE | 199 30 664 | 1/2001 |
| DE | 199 30 665 | 1/2001 |
| WO | 00/39169 | 7/2000 |
| WO | 01/44327 | 6/2001 |

OTHER PUBLICATIONS

Derwent Abstract XP002184006 (=JP 53 00 2579; Jan. 11, 1978).
Hoering et al., *Plaste und Kautschuk*, Jan. 1985, 32(9), 326-329.
Crivello et al., *Polymer Bulletin*, 1986, 16, 95-102.
Otsu, *Adv. Poly. Sci.*, 1998, 136, 75-137.
Cacioli, *J. Mac. Sci.-Chem.*, A23(7), 1986, 839-852.
De Leon-Saenz et al., *Macromol. Chem. Phys.*, 201, No. 1, 2000, 74-83.

* cited by examiner

Primary Examiner—Peter D. Mulcahy
(74) *Attorney, Agent, or Firm*—Novak Druce & Quigg LLP

(57) ABSTRACT

A reaction product (A) which can be prepared by reaction, under free radical conditions, of at least one monomer (a) capable of free radical reaction, in the presence of at least one free radical initiator and of a radical of the formula (III)

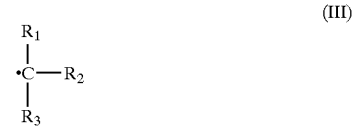

where $R_1$ to $R_3$, in each case independently of one another, are hydrogen, methyl or a radical-stabilizing and/or bulky group selected from an unsubstituted or substituted, linear or branched alkyl of two or more carbon atoms, cycloalkyl, alcohol, ether, polyether, amine, aralkyl radical, a substituted or unsubstituted aromatic, heterocyclic or olefinic hydrocarbon, a halogen atom, a substituted or unsubstituted, linear or branched alkenyl or alkynyl group, —C(O)$R_5$, —C(O)O$R_5$, —CR$_5$R$_6$—O—R$_7$, —O—C(O)R$_5$, —CN, —O—CN, —S—CN, —O—C=NR$_5$, —S—C=NR$_5$, —O—CR$_5$R$_6$—CR$_7$R$_8$NR$_9$R$_{10}$, —N=C=O, —C=NR$_5$, —CR$_5$R$_6$-Hal, —C(S)R$_5$, —CR$_5$R$_6$—P(O)R$_7$R$_8$, —CR$_5$R$_6$—PR$_7$R$_8$, —CR$_5$R$_6$—NR$_7$R$_8$, —CR$_5$R$_6$(OR$_7$)(OR$_8$), —CR$_5$R$_6$(OR$_7$)(NR$_8$), —CR$_5$R$_6$(NR$_7$)(NR$_8$), an anhydride, acetal or ketal group, —SO$_2$R$_5$, an amidine group, —NR$_5$C(S)NR$_6$, —NR$_5$C(S)—OR$_6$, —N=C=S, —NO$_2$, —C=N—OH, —N(R$_5$)=NR$_6$, —PR$_5$R$_6$R$_7$, —OSiR$_5$R$_6$R$_7$ or —SiR$_5$R$_6$R$_7$, where $R_5$ to $R_{10}$, independently of one another in each case, are defined in the same way as $R_1$ to $R_4$, or two of the radicals $R_1$ to $R_4$ form a $C_4$- to $C_7$-ring which in turn may be substituted or unsubstituted and, if required, may contain one or more heteroatoms, with the proviso that at least two of the radicals $R_1$ to $R_3$ are a radical-stabilizing and/or bulky group as defined above, has various uses.

25 Claims, No Drawings

USE OF POLYMERIC REACTION PRODUCT

The present invention relates to various uses of a reaction product (A) which was prepared by reaction, under free radical conditions, of at least one monomer (a), capable of free radical reaction, in the presence of at least one free radical initiator and of a radical of the formula (III), as defined below.

The technical field of the present invention is the use of reaction products or polymers which were prepared by free radical polymerization in many applications in various technical fields, such as inkjet inks, cosmetics, coating materials and engineering materials.

The reaction products (A) or polymers (B) used within the scope of the present invention are known per se or form the subject of a parallel application of the Applicant.

In this context, reference may be made to DE 198 58 708.2 and the prior art cited therein. The preparation of the polymers used according to the invention has moreover been the subject of numerous scientific investigations.

A free radical chain polymerization or copolymerization with an ω-unsaturated oligo(methyl methacrylate) with ethyl acrylate, styrene, methyl methacrylate, acrylonitrile and vinyl acetate as copolymers is described in a scientific article in J. Macromol. Sci. Chem. A 23 (7) (1986), 839–852.

Furthermore, free radical chain polymerizations and copolymerizations using 1,2-(trimethylsilyloxy)tetraphenylethane are described in Macromol. Chem. Phys. 201 (2000), 74–83, methyl methacrylate, styrene, phenyl acetate, butyl acrylate and glycidyl methacrylate being used as monomers there.

An overview of free radical chain polymerizations using in particular tetraphenylethane (derivatives) is given by Otsu and Matsumoto in Advances in Polymer Science 136, 75–137, and in Polymer Bulletin 16 (1986), 95–102.

Furthermore, Harwood et al. in Macromol. Symp. 111 (1996), 25–35 report on NMR investigations into random, block and graft copolymers using NMR-sensitive initiators and macroinitiators. Inter alia, the reaction of a methyl methacrylate/stilbene mixture and the properties of the polymer resulting therefrom are described there.

The abovementioned scientific papers are concerned exclusively with the reaction mechanism on which free radical chain polymerization is based or relate to investigations into the structure of the resulting products. Possible uses of the reaction products or polymers discussed therein are not mentioned.

It is an object of the present invention to demonstrate the numerous potential uses of such specific reaction products or polymers prepared by free radical chain polymerization. The reaction products and polymers described herein are of considerable interest since the chosen method of preparation makes it possible to establish the properties of these products in a specific manner with regard to the wide range of potential uses, in particular by the preparation of block structures by means of free radical polymerization.

In the context of the present invention, a block copolymer is understood as meaning a polymer which has at least two polymer blocks characterized by different monomer compositions. In the context of the present invention, different monomer compositions is understood as meaning that at least two regions of the block copolymer have different monomer compositions. In the context of the present invention, it is possible for the transition between two blocks to be continuous, i.e., for there to exist between two blocks a zone which has a random or regular sequence of the monomers constituting the blocks. In the context of the present invention, however, it is also envisaged that the transition between two blocks is essentially discontinuous. An essentially discontinuous transition is understood as meaning a transition zone which has a substantially shorter length than at least one of the blocks separated by the transition zone. It is possible for a block to be based only on one type of monomer. However, it is also envisaged that a block is composed of two or more monomers. In a preferred embodiment of the present invention, the chain length of such a transition zone is less than $\frac{1}{10}$, preferably less than $\frac{1}{20}$, of the block length of at least one of the blocks separated by the transition zone.

In the context of the present invention different monomer compositions is furthermore understood as meaning that the monomers constituting the respective block differ in at least one feature, for example in their linkage to one another, in their conformation or in their constitution. If, as described above, a block is composed of more than one type of monomer, in the present context different blocks of the block copolymer can, for example, also differ by having different concentrations of the monomers constituting a block in each case. In the context of the present invention, block copolymers preferably used are those which have at least two blocks whose monomer compositions differ at least in the constitution of the monomers.

We have found that the abovementioned and further objects are achieved by the use of a reaction product (A) which can be prepared by means of a process comprising the following stage (i):

(i) Reaction, under free radical conditions, of a reaction mixture comprising at least one monomer (a), capable of free radical reaction, in the presence of at least one radical of the formula (III)

where $R_1$ to $R_3$, in each case independently of one another, are hydrogen, methyl or a radical-stabilizing and/or bulky group selected from an unsubstituted or substituted, linear or branched alkyl of two or more carbon atoms, cycloalkyl, alcohol, ether, polyether, amine, aralkyl radical, a substituted or unsubstituted aromatic, heterocyclic or olefinic hydrocarbon, a halogen atom (Hal), a substituted or unsubstituted, linear or branched alkenyl or alkynyl group, —C(O)R$_5$, —C(O)OR$_5$, —CR$_5$R$_6$—O—R$_7$, —O—C(O)R$_5$, —CN, —O—CN, —S—CN, —O—C=NR$_5$, —S—C=NR$_5$, —O—CR$_5$R$_6$—CR$_7$R$_8$NR$_9$R$_{10}$, —N=C=O, —C=NR$_5$, —CR$_5$R$_6$-Hal, —C(S)R$_5$, —CR$_5$R$_6$—P(O)R$_7$R$_8$, —CR$_5$R$_6$—PR$_7$R$_8$, —CR$_5$R$_6$—NR$_7$R$_8$, —CR$_5$R$_6$(OR$_7$)(OR$_8$), —CR$_5$R$_6$(OR$_7$)(NR$_8$), —CR$_5$R$_6$(NR$_7$)(NR$_8$), an anhydride, acetal or ketal group, —SO$_2$R$_5$, an amidine group, —NR$_5$C(S)NR$_6$, —NR$_5$C(S)—OR$_6$, —N=C=S, —NO$_2$, —C=N—OH, —N(R$_5$)=NR$_6$, —PR$_5$R$_6$R$_7$, —OSiR$_5$R$_6$R$_7$ or —SiR$_5$R$_6$R$_7$, where R$_5$ to R$_{10}$, independently of one another in each case, are defined in the same way as R$_1$ to R$_4$, or two of the radicals R$_1$ to R$_4$ form a C$_4$- to C$_7$-ring which in turn may be substituted or unsubstituted and, if required, may contain one or more heteroatoms, with the proviso that
at least two of the radicals $R_1$ to $R_3$ are a radical-stabilizing and/or bulky group as defined above,
as a component in coating materials,
in finishes and coating materials,
as a component in toners,
as a component in cosmetics,
as a component in resin material,
as a component in retention aids for papermaking,
as a component in solubilizers in pharmaceutical and cosmetic formulations,
as incrustation inhibitors and/or soil-release polymers in detergents,
as a component in filtration assistants and for protecting and clarifying beverages,
as a component in disinfectants,
as a component in elastomeric binders,
in printing plates,
as a dispersant, preferably in inkjet pigment formulations,
as an assistant in a tablet matrix,
as an assistant in the plasticizing of concrete,
as biodegradable polymers for, for example, materials for implants, surgical suture materials and garbage bags,
as a component in wallpaper adhesive,
as a component of plastics used in automotive construction, in the household sector, for leisure articles, in the production of road signs, window profiles, lamp covers, garden furniture, boats, surfboards, toys, in the packaging sector, in the production of massage apparatuses and housings therefor, in the production of medical equipment, in the production of equipment for information processing and transmission, in the production of extensive wall elements, in transport containers, in
housings for electrical equipment, in moldings for the construction sector or in grating covers, and the use of a polymer (B) which can be prepared by a process comprising the stage (ii):
(ii) Reaction of the reaction product (A) obtained in stage (i), under free radical conditions, in the presence of at least one monomer (b) capable of free radical homopolymerization or copolymerization,
as a component in coating materials,
in finishes and coating materials,
as a component in toners,
as a component in cosmetics,
as a component in resin material,
as a component in retention aids for papermaking,
as a component in solubilizers in pharmaceutical and cosmetic formulations,
as a component in incrustation inhibitors and/or soil-release polymers in detergents,
as a component in filtration assistants and for protecting and clarifying beverages,
as a component in disinfectants,
as a component in elastomeric binders,
in printing plates,
as a dispersant, preferably in inkjet pigment formulations,
as an assistant in a tablet matrix,
as an assistant in the plasticizing of concrete,
as biodegradable polymers for, for example, materials for implants, surgical suture materials and garbage bags,
as a component in wallpaper adhesive,
as a component of plastics used in automotive construction, in the household sector, for leisure articles, in the production of road signs, window profiles, lamp covers, garden furniture, boats, surfboards, toys, in the packaging sector, in the production of massage apparatuses and housings therefor, in the production of medical equipment, in the production of equipment for information processing and transmission, in the production of extensive wall elements, in transport containers, in housings for electrical equipment, in moldings for the construction sector or in grating covers.

Preferably, the radical of the formula (III) is derived from at least one compound of the formula (I)

(I)

where $R_1$ to $R_4$, in each case independently of one another, are hydrogen, methyl or a radical-stabilizing and/or bulky group selected from an unsubstituted or substituted, linear or branched alkyl of two or more carbon atoms, cycloalkyl, alcohol, ether, polyether, amine, aralkyl radical, a substituted or unsubstituted aromatic, heterocyclic or olefinic hydrocarbon, a halogen atom, a substituted or unsubstituted, linear or branched alkenyl or alkynyl group, $—C(O)R_5$, $—C(O)OR_5$, $—CR_5R_6—O—R_7$, $—O—C(O)R_5$, $—CN$, $—O—CN$, $—S—CN$, $—O—C=NR_5$, $—S—C=NR_5$, $—O—CR_5R_6—CR_7R_8NR_9R_{10}$, $—N=C=O$, $—C=NR_5$, $—CR_5R_6\text{-Hal}$, $—C(S)R_5$, $—CR_5R_6—P(O)R_7R_8$, $—CR_5R_6—PR_7R_8$, $—CR_5R_6—NR_7R_8$, $—CR_5R_6(OR_7)(OR_8)$, $—CR_5R_6(OR_7)(NR_8)$, $—CR_5R_6(NR_7)(NR_8)$, an anhydride, acetal or ketal group, $—SO_2R_5$, an amidine group, $—NR_5C(S)NR_6$, $—NR_5C(S)—OR_6$, $—N=C=S$, $—NO_2$, $—C=N—OH$, $—N(R_5)=NR_6$, $—PR_5R_6R_7$, $—OSiR_5R_6R_7$ or $—SiR_5R_6R_7$, where $R_5$ to $R_{10}$, independently of one another in each case, are defined in the same way as $R_1$ to $R_4$, or two of the radicals $R_1$ to $R_4$ form a $C_4$- to $C_7$-ring which in turn may be substituted or unsubstituted, with the proviso that
at least two of the radicals $R_1$ to $R_4$ are a radical-stabilizing and/or bulky group, as defined above, or diphenylethylene, dinaphthylethylene, 4,4'-vinylidenebis(N,N'-dimethylaniline), 4,4'-vinylidenebis(aminobenzene) or cis- or trans-stilbene, and/or
from at least one compound of the formula (II)

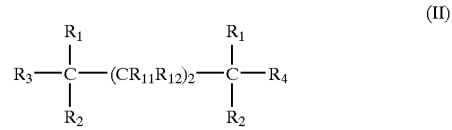

(II)

where $R_1$ to $R_4$ and $R_{11}$ and $R_{12}$, in each case independently of one another, are hydrogen, methyl or a radical-stabilizing and/or bulky group selected from an unsubstituted or substituted, linear or branched alkyl of two or more carbon atoms, cycloalkyl, alcohol, ether, polyether, amine, aralkyl radical, a substituted or unsubstituted aromatic, heterocyclic or olefinic hydrocarbon, a halogen atom, a substituted or unsubstituted, linear or branched alkenyl or alkynyl group, —C(O)R$_5$, —C(O)OR$_5$, —CR$_5$R$_6$—O—R$_7$, —O—C(O)R$_5$, —CN, —O—CN, —S—CN, —O—C=NR$_5$, —S—C=NR$_5$, —O—CR$_5$R$_6$—CR$_7$R$_8$NR$_9$R$_{10}$, —N=C=O, —C=NR$_5$, —CR$_5$R$_6$-Hal, —C(S)R$_5$, —CR$_5$R$_6$—P(O)R$_7$R$_8$, —CR$_5$R$_6$—PR$_7$R$_8$, —CR$_5$R$_6$—NR$_7$R$_8$, —CR$_5$R$_6$(OR$_7$)(OR$_8$), —CR$_5$R$_6$(OR$_7$)(NR$_8$), —CR$_5$R$_6$(NR$_7$)(NR$_8$), an anhydride, acetal or ketal group, —SO$_2$R$_5$, an amidine group, —NR$_5$C(S)NR$_6$, —NR$_5$C(S)—OR$_6$, —N=C=S, —NO$_2$, —C=N—OH, —N(R$_5$)=NR$_6$, —PR$_5$R$_6$R$_7$, —OSiR$_5$R$_6$R$_7$ or —SiR$_5$R$_6$R$_7$, where R$_5$ to R$_{10}$, independently of one another in each case, are defined in the same way as R$_1$ to R$_4$, or two of the radicals R$_1$ to R$_4$ form a C$_4$- to C$_7$-ring which in turn may be substituted or unsubstituted and, if required, may contain one or more heteroatoms, with the proviso that
at least two of R$_1$ to R$_4$ are a radical-stabilizing and/or bulky group, as defined above.

In the preparation of the reaction product (A) used according to the invention and/or of the polymer (B), all monomers capable of free radical reaction can be used as monomer (a).

It is of course also possible to use mixtures of different monomers as monomers (a) in the context of the present invention.

According to the abovementioned process, it is also possible to polymerize mixtures of at least one hydrophilic monomer and at least one hydrophobic monomer.

Specific examples of monomers (a) are:
Dienes, such as butadiene, isoprene, myrcene, pentadienes, and furthermore C$_1$- to C$_{20}$-alkyl and hydroxyalkyl esters of monoethylenically unsaturated C$_3$- to C$_{10}$-monocarboxylic acids or C$_4$- to C$_8$-dicarboxylic acids, for example methyl methacrylate, ethyl methacrylate, propyl methacrylate (all isomers), butyl methacrylate (all isomers), 2-ethylhexyl methacrylate, isobornyl methacrylate, methyl acrylate, ethyl acrylate, propyl acrylate (all isomers), butyl acrylate (all isomers), 2-ethylhexyl acrylate, isobornyl acrylate, benzyl acrylate, phenyl acrylate, stearyl acrylate, diethyl maleate, hydroxyethyl acrylate, hydroxypropyl acrylate, hydroxybutyl acrylate, furthermore (meth)acrylates of alkoxylated C$_1$- to C$_{18}$-alcohols which have been reacted with from 2 to 50 mol of ethylene oxide, propylene oxide, butylene oxide and mixtures thereof; benzyl methacrylate, phenyl methacrylate, stearyl methacrylate, methacrylonitrile, styrene, α-methylstyrene, acrylonitrile, functionalized methacrylates; acrylates and styrenes selected from glycidyl methacrylate, 2-hydroxyethyl methacrylate, hydroxypropyl methacrylate (all isomers), hydroxybutyl methacrylate (all isomers), cyclohexyl methacrylate, cyclohexyl acrylate, hexyl methacrylate and hexyl acrylate (in each case all isomers), diethylaminoethyl methacrylate, triethylene glycol methacrylate, itaconic anhydride, itaconic acid, glycidyl acrylate, 2-hydroxyethyl methacrylate, diethylaminoethyl acrylate, triethylene glycol acrylate, methacrylamide, N-tert-butylmethacrylamide, N-n-butylmethacrylamide, N-methylolmethacrylamide, N-ethylolmethacrylamide, N-tert-butylacrylamide, N-butylacrylamide, N-methylolacrylamide, N-ethylolacrylamide, vinylbenzoic acid (all isomers), diethylaminostyrene (all isomers), α-methylvinylbenzoic acid (all isomers), diethylamino-α-methylstyrene (all isomers), p-methylstyrene, p-vinylbenzenesulfonic acid, trimethoxysilylpropyl methacrylate, triethoxysilylpropyl methacrylate, tributoxysilylpropyl methacrylate, triethoxy-methylsilyipropyl methacrylate, dibutoxymethylsilylpropyl methacrylate, diisopropoxynethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl acetate and vinyl butyrate, vinyl chloride, vinyl fluoride, vinyl bromide, vinyl alcohol, vinyl ethers of C$_1$- to C$_{18}$-alcohols, vinyl ethers of alkoxylated C$_1$- to C$_{18}$-alcohols and vinyl ethers of polyalkylene oxides, such as polyethylene oxide, polypropylene oxide or polybutylene oxide, monoethylenically unsaturated C$_3$- to C$_{10}$-monocarboxylic acids, their alkali metal salts and/or ammonium salts, for example acrylic acid, methacrylic acid, dimethylacrylic acid, ethylacrylic acid, allylacelic acid or vinylacetic acid, furthermore monoethylenically unsaturated C$_4$- to C$_8$-dicarboxylic acids, their monoesters, anhydrides, alkali metal salts and/or ammonium salts, for example maleic acid, fumaric acid, itaconic acid, mesaconic acid, methylenemalonic acid, citraconic acid, maleic anhydride, itaconic anhydride or methylmalonic anhydride; furthermore monoethylenically unsaturated monomers containing sulfo groups and their salts, for example their alkali metal or ammonium salts, for example allylsulfonic acid, styrenesulfonic acid, 2-acrylamido-2-methylpropanesulfonic acid (AMPS), methallylsulfonic acid, vinylsulfonic acid, 3-sulfopropyl acrylate or 3-sulfopropyl methacrylate, furthermore monoethylenically unsaturated monomers containing phosphonic acid groups or their salts, for example their alkali metal or ammonium salts, for example vinylphosphonic acid, allylphosphonic acid or acrylamidoethylpropanephosphonic acid, furthermore amides and N-substituted amides of monoethylenically unsaturated C$_3$- to C$_{10}$-monocarboxylic acids or C$_4$- to C$_8$-dicarboxylic acids, for example acrylamide, N-alkylacrylamides or N,N-dialkylacrylamides, each having 1 to 18 carbon atoms in the alkyl group, such as N-methylacrylamide, N,N-dimethylacrylamide, N-tert-butylacrylamide or N-octadecylacrylamide, N-monomethylhexylmaleamide, N-monodecylmaleamide, diethylaminopropylmethacrylamide or acrylamidoglycollic acid; furthermore alkylaminoalkyl (meth)acrylates, for example dimethylaminoethyl acrylate, dimethylaminoethyl methacrylate, ethylaminoethyl acrylate, diethylaminoethyl methacrylate, dimethylaminopropyl acrylate or dimethylaminopropyl methacrylate; furthermore vinyl esters, such as vinyl formate, vinyl acetate or vinyl propionate, where these may also be present in hydrolyzed form after the polymerization; furthermore N-vinyl compounds, for example N-vinylpyrrolidone, N-vinylcaprolactam, N-vinylformamide, N-vinyl-N-methylformamide, 1-vinyl-imidazole or 1-vinyl-2- methylimidazole; furthermore vinyl ethers of $C_1$- to $C_{18}$-alcohols, vinyl ethers of alkoxylated $C_1$- to $C_{18}$-alcohols and vinyl ethers of polyalkylene oxides, such as polyethylene oxide, polypropylene oxide or polybutylene oxide, styrene or its derivatives such as α-methylstyrene, indene, dicyclopentadiene, monomers which carry amino or imino groups, such as dimethylaminoethyl methacrylate, diethylaminoethyl acrylate, diethylaminopropyl methacrylamide or allylamine, monomers which carry quaternary ammonium groups, for example present as salts, as obtained by reacting basic amino functions with acids, such as hydrochloric acid, sulfuric acid, nitric acid, formic acid or acetic acid, or in quaternized form (examples of suitable quaternizing agents are dimethyl sulfate, diethyl sulfate, methyl chloride, ethyl chloride or benzyl chloride), e.g. dimethylaminoethyl acrylate hydrochloride, diallyldimethylammonium chloride, dimethylaminoethyl acrylate methylchloride, dimethylaminoethylaminopropylmethacrylamide methosulfate, vinylpyridinium salts or 1-vinylimidazolium salts; monomers in which the amino groups and/or ammonium groups are liberated only after the polymerization and subsequent hydrolysis, for example N-vinylformamide or N-vinylacetamide, and mixtures of two or more of the abovementioned monomers.

Styrenes, acrylonitrile, (meth)acrylates or their free acid, dienes or N-vinyl compounds, preferably the members of this group which have been mentioned above, or mixtures of two or more thereof, if required with at least one further monomer (a) capable of free radical homopolymerization or copolymerization, are preferably used as a first monomer (a).

According to the invention, a compound of the formula (I)

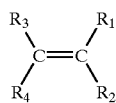

(I)

or of the formula (II)

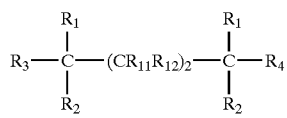

(II)

is furthermore used in the preparation of the reaction product (A), in order to obtain the radical of the formula (III).

Here too, in principle all compounds of the abovementioned formulae can be used according to the invention, provided that they correspond to the above definition or the definition given in the claims.

It is particularly important that at least two of the radicals $R_1$ to $R_4$ or $R_1$ to $R_3$ in formula (III) are a radical-stabilizing and/or bulky group. The term bulky group as used in the context of the present invention means that it is a group whose dimensions in each case in the novel reaction under free radical conditions are greater than or equal to the dimensions of an isopropyl radical. The term radical-stabilizing group used according to the invention denotes groups of the type defined in claim 1, whose electron structure permits stabilization of radicals.

Specific examples are the following groups of the abovementioned type: branched alkyl groups of three or more carbon atoms, in particular isopropyl and tert-butyl; cycloalkyl groups, for example unsubstituted or substituted cyclopentyl or cyclohexyl; alcohol groups, for example radicals of branched alcohols, such as isopropoxy or tert-butoxy; aralkyl radicals; substituted or unsubstituted aromatic or heterocyclic hydrocarbons, such as phenyl or pyridyl; halogen; cyano; nitro; ester groups of the structure —C(O)OR$_5$, where the radical R$_5$ may be, for example, linear or branched, unsubstituted or substituted alkyl, aralkyl or an aromatic or heteroaromatic group.

Other preferred compounds of the formula (I) are those which have, as radical-stabilizing groups, the following combination of groups:

at least one substituted or unsubstituted phenyl or C(O)R$_5$;
at least one substituted or unsubstituted phenyl and CN;
at least one substituted or unsubstituted phenyl and C(O)OR$_5$;
independently of one another, at least two substituted or unsubstituted phenyl groups,
independently of one another, at least two C(O)OR$_5$; and
independently of one another, at least two CN.

In particular.
1,1,4,4-tetraphenyl 1,3-butadiene
1,4-bis(2-methylstyryl)benzene
1,2,3,4,5-pentaphenyl-1,3-cyclopentadiene
1,2,3,4-tetraphenyl-1,3-cyclopentadiene
acenaphthylene
cis- and trans-alpha-methylstilbene
cis- and trans-4,4'-diphenylstilbene, diphenylethylene, dinaphthylethylene, 4,4'-vinylidenebis(N,N'-dimethylaniline), 4,4'-vinylidenebis(amino-benzene), cis- and trans-stilbene,
trans-trans- and trans-cis- and cis-cis-1,4-diphenyl-1,3-butadiene
alpha,omega-tetraphenylpolyethyne
diphenylfulvene
triphenylethene
tetraphenylethene
1-cyano-1-phenylethylene; 1-alkoxycarbonyl-1-phenylethylene; 1,1-dialkoxycarbonyl-2-ethylethylene; 1,1-dialkoxycarbonyl-2-phenylethylene, 1,1-dialkoxycarbonyl-2,2-dimethylethylene; 1,1-dialkoxycarbonylmethylethylene;
9-methylenexanthene; 9-methylenethioxanthene, 9-methylene-10-H-acridine or mixtures of two or more thereof are used as the compound of the formula (I) or (II).

According to the invention, the radical formation may be effected by different methods. For example, thermal, photochemical, electrochemical or electron-transfer-induced production is just as possible as the use of oxidizing or reducing agents for producing radicals.

In addition, the process described herein can be carried out in the presence of at least one free radical initiator. Thermally, electrochemically or photochemically initiating monomers may also be used as initiators. In general, however, all azo and/or peroxo compounds conventionally used in free radical chain polymerization and/or compounds having homolytically cleavable C—C bonds may be used. Suitable initiators are described, for example, on page 10, line 17 to page 11, line 15 of WO 98/01478, which is hereby fully incorporated in the context of the present application; in addition, 3,4-dimethyl-3,4-diphenylhexane and 2,3-dimethyl-2,3-diphenylbutane may be used. Preferably used initiators are those which are soluble in the reaction system used in each case, In the case of reaction in the aqueous phase, oxidizing free radical initiators, e.g. potassium, sodium and ammonium peroxodisulfate, or a combination of a conventional, i.e. of a nonoxidizing, initiator with $H_2O_2$ are preferably used. Dicumyl peroxide, dibenzoyl peroxide, dilauryl peroxide and AIBN may also be used.

In a preferred embodiment of the process a comparatively large amount of free radical initiator is added, the amount of free radical initiator as a proportion of the reaction mixture preferably being from 0.1 to 50, particularly preferably from 0.5 to 20, % by weight, based in each case on the total amount of the monomer (a) and of the initiator. The molar ratio of initiator to compound (I) is preferably from 3:1 to 1:3, particularly preferably from 2:1 to 1:2. in particular from 1.5:1 to 1:1.5.

If the described reaction according to stage (i) is carried out in the aqueous phase, the term aqueous phase is understood in the context of the present text as meaning a phase which contains from 10 to 100% by weight of water. If the amount of water in the aqueous phase is less than 10%, it is preferable in the context of the present invention if the aqueous phase contains a mixture of water and one or more water-miscible solvents, such as THF, methanol, ethanol, propanol, butanol, acetone, methyl ethyl ketone or the like. However, it is also possible to carry out the reaction according to stage (i) in the presence of a mixture of water and a water-immiscible solvent, such as an aromatic solvent, for example toluene.

In a further embodiment, the above reaction according to stage (i) is carried out in the presence of at least one base. The low molecular weight bases used may be in principle all low molecular weight bases, NaOH, KOH, ammonia, diethanolamine, triethanolamine, mono-, di- or triethylamine, dimethylethanolamine or a mixture of two or more thereof being preferred and ammonia and di- and triethanolamine being particularly preferred.

However, it is also possible to carry out the reaction according to stage (i) in an organic solvent or in the absence of a solvent, for example in the melt. When the term reaction in an organic solvent or in the absence of a solvent is used in the context of the present invention, it is understood as meaning a reaction which takes place in the presence of less than 10, preferably less than 5 or less than 1, % by weight of water. In a further embodiment of the present invention, at least one block copolymer in whose preparation stage (i) was carried out in an organic solvent or in the absence of a solvent is used in the novel binder composition, the water content of the reaction mixture being less than 0.5, for example less than 0.3 or less than 0.1, % by weight. In a further embodiment of the present invention, the reaction of stage (i) is carried out in the absence of water, i.e. with a water content of less than 0.001% by weight. Such water contents can be achieved, for example, by using commercially available solvents, as usually used as organic solvents in free radical polymerizations.

In the context of the present invention, suitable solvents are in principle all polar and nonpolar organic solvents in which the corresponding polymers and preferably also the polymers formed are soluble, if necessary at elevated temperature. Suitable solvents are, for example, $C_3$- to $C_{10}$-alkanes, cyclohexane, decalin, acetone, methyl ethyl ketone, diisobutyl ketone, tetrahydrofuran, dioxane, benzene, toluene, glycols such as ethylene glycol and triethylene glycol, glycol ethers in which some or all of the terminal groups are blocked, such as ethylene glycol monomethyl ether, ethyl acetate, methanol or ethanol or the higher homologs of the alkanols of up to 18 carbon atoms (if necessary as cosolvent) or mixtures of two or more thereof.

The reaction according to stage (i) is generally carried out at above room temperature and below the decomposition temperature of the monomers, preferably a temperature range from 50 to 200° C., further preferably from 70 to 150° C., in particular from 80 to 120° C., being chosen.

The reaction according to stage (i) is generally carried out at pressures from 1 to 300, for example from about 1.5 to 100 or from about 2 to about 20, bar.

Although there are no restrictions at all regarding the molecular weight distribution, a reaction product which has a molecular weight distribution $M_w/M_n$, measured by gel permeation chromatography using polystyrene as standard, of $\leq 4$, preferably $\leq 3$, further preferably $\leq 2$, in particular $\leq 1.5$ and in specific cases also $\leq 1.3$ can be obtained in the reaction according to (i). The molecular weight of the reaction product (A) can be controlled within wide limits by the choice of the ratio of monomers (a) to compounds (I) to free radical initiator. In particular, the content of compound (I) determines the molecular weight and does so in such a way that the larger the amount of compound (I) the lower the molecular weight obtained.

The reaction according to stage (i) can also be carried out in the presence of a surfactant.

The reaction product obtained in the reaction according to (i) can be further processed directly or can be used as a macroinitiator for the further reaction according to stage (ii), as defined further below herein. It is also possible to isolate the reaction product according to stage (i) as a solid and then to react it further or to use it.

At least one freely selectable monomer (b) capable of free radical homopolymerization or copolymerization can be subjected to the reaction according to stage (ii), suitable monomers (b) being the monomers mentioned above in conjunction with the explanation of the monomers (a).

Monomer (b) may be identical to or different from the monomer (a) used in stage (i). It is of course also possible to use mixtures of two or more monomers as monomer (a) or monomer (b). The choice of the monomer (b) is made in principle according to the desired structure of the polymer prepared in stage (ii) and hence depending on the desired use of this polymer.

Specific examples are the following monomers (b) preferably to be used:

Styrene and derivatives, e.g. styrenesulfonic acid, methacrylic acid and acrylic acid, and the esters of these acids with methanol, ethanol, propanol (all isomers), butanol (all isomers), hexane (all isomers), vinyl acetate, hydroxyethyl acrylate, hydroxyethyl methacrylate, N-vinyl compounds, e.g. N-vinylpyrrolidone, and dienes, such as butadiene, isopiene, myrcene and pentadiene.

Accordingly, the present invention also relates to a process for the preparation of a polymer (B), which comprises:

(ii) Reaction of the reaction product (A) obtained in stage (i), under free radical conditions, in the presence of at least one monomer (b) capable of free radical homopolymerization or copolymerization.

The reaction according to stage (ii) is carried out in principle under the conventional conditions for a free radical polymerization or under the conditions prevailing in stage (i) it being possible for suitable solvents to be present.

In a further embodiment of the present invention, stage (ii) can be carried out in the presence of compounds of the formula I or II, which are added after the end of stage (i).

In the process described herein, stages (i) and (ii) can be carried out separately from one another both in terms of space and in terms of time, in which case, of course, stage (i) is carried out first, followed by stage (ii). In addition, however, stages (i) and (ii) can also be carried out in succession in one reactor, i.e. first the compound of the formula (I) is reacted completely or partially with at least one monomer (a), depending on the desired use or the desired properties, and then at least one monomer (b) is added and is subjected to free radical polymerization, or a monomer mixture comprising at least one monomer (a) and at least one monomer (b) is used from the outset and is reacted with the compound (I). It is assumed that first the compound (I) reacts with the at least one monomer (a) and then the reaction product (A) formed therefrom also reacts with the monomer (b) above a specific molecular weight. In this context, it should be noted in particular that the novel (co)polymerization can be continued after any interruption without further addition of initiator, by heating to a temperature at which the macroinitiator formed according to reaction product (A) decomposes again.

The resulting polymer (reaction product (A)) can be isolated or can be reheated in situ to initiate the (further) polymerization. Further monomer (b) can be identical to or different from monomer (a). It is also possible to use monomer mixtures from the outset. Stage (ii) can be repeated as often as desired, if necessary after isolation of the respective products in the individual stages.

Depending on the reaction procedure, it is possible according to the invention to prepare polymers functionalized at the terminal groups, segmented polymers, block, multiblock or gradient (co)polymers, star (co)polymers, graft copolymers and branched and hyperbranched (co)polymers.

As is evident from the above, the present invention also relates to the use of the polymer (B), which can be prepared by the process defined above, for numerous applications. The reaction is preferably carried out in such a way that a polymer (B) which has a block structure is obtained. Using an easily obtainable compound (I), it is possible in a simple manner to provide block copolymers which have, for example, a hydrophilic block, e.g. a (meth)acrylic acid or a $C_{1-4}$-alkyl (meth)acrylate block, and a fisher, preferably hydrophobic polymer block, e.g. a block based on vinylaromatic monomers, such as styrene or substituted styrenes, acrylonitrile, dienes and nonaromatic vinyl compounds, such as vinyl acetate, and higher (>$C_4$) alkyl (meth)acrylates.

Polymers of the following structure are preferably used:
Poly((meth)acrylic acid-stat-(meth)acrylate-b-(styrene-stat-(meth)acrylate)), where the term (meth)acrylate denotes alkyl esters of methacrylic acid or acrylic acid.
Specific examples are the following block copolymers:
Poly(acrylic acid-b-styrene), poly(methyl methacrylate-b-styrene), poly(styrene-b-vinyl acetate), poly(methacrylic acid-b-hydroxyethyl acrylate), poly(methyl methacrylate-b-N-vinylpyrrolidone), poly(methyl methacrylate-b-N-vinylformamide), poly(methyl methacrylate-b-hydroxyethyl acrylate), poly(methyl methacrylate-b-(styrene-stat-acrylonitrile)), poly(n-butyl acrylate-b-styrene-b-n-butyl acrylate), poly(methyl methacrylate-b-styrene-b-methyl methacrylate-b-styrene), poly(n-butyl acrylate-b-styrene-b-n-butyl acrylate-b-styrene), poly((meth)acrylic acid-stat-(meth)acrylate-b-(styrene-stat-(meth)acrylate)).

Specific examples are the following block copolymers:
Poly(styrene-b-acrylic acid), poly(styrene-b-methyl acrylate), poly(styrene-b-ethyl acrylate), poly(styrene-b-methacrylic acid), poly(styrene-b-methyl methacrylate), poly(styrene-b-ethyl methacrylate), poly(hydroxyethyl acrylate-b-methacrylic acid), poly(N-vinylpyrrolidone-b-methyl acrylate), poly(N-vinylpyrrolidone-b-ethyl acrylate), poly(N-vinylpyrrolidone-b-methyl methacrylate), poly(N-vinylpyrrolidone-b-ethyl methacrylate), poly(N-vinylpyrrolidone-b-styrene), poly(N-vinylpyrrolidone-b-vinyl acetate), poly(N-vinylpyrrolidone-b-(α-methylstyrene), poly(N-vinylformamide-b-methyl methacrylate), poly(N-vinylformamide-b-ethyl methacrylate), poly(N-vinylformamide-b-vinyl acetate), poly(N-vinylformamide-b-methyl acrylate) or poly(N-vinylformamide-b-ethyl acrylate).

The following can also be prepared according to the present invention:
Poly(methyl methacrylate-b-(styrene-stat-acrylonitrile), poly(n-butyl acrylate-b-styrene-b-n-butyl acrylate), poly(styrene-b-n-butyl acrylate-b-styrene), poly(styrene-b-n-butyl acrylate-b-styrene-b-n-butyl acrylate), poly(methyl methacrylate-b-styrene-b-methyl methacrylate-b-styrene), poly(n-butyl acrylate-b-styrene-b-n-butyl acrylate-b-styrene), poly(styrene-b-polybutadiene), poly(styrene-b-styrene-stat-butadiene), poly(styrene-stat-acrylonitrile-b-butadiene), poly-(styrene-stat-acrylonitrile-b-styrene-stat-butadiene), poly(styrene-stat-acrylonitrile-b-styrene-stat-acrylonitrile-stat-butadiene), poly(styrene-b-vinylpyrrolidone), poly(styrene-stat-acrylonitrile-vinylpyrrolidone), poly(n-butyl acrylate-b-styrene), poly(n-butyl acrylate-styrene-acrylonitrile) and their ABA/ABC three-block polymers or higher block polymers and the like.

As stated at the outset, the present invention relates to the use of the reaction products (A) and/or (B) described above for improving or providing specific properties within application products. The reaction products (A) and/or polymers (B) described herein (often referred to below as components) can be used individually or as a mixture of two or more thereof. Furthermore, it is possible to use the components as such or in the form of solutions, suspensions, dispersions, emulsions, solids or engineering material, and to do so as a function of the respective method of use. The novel uses are described individually in detail below, reference being made where possible to publications in which the use described herein has been described in principle with the use of other polymers or reaction products.

Use as Component of Coating Materials, in Particular in Finishes and Surface Coatings The reaction products (A) described herein and the polymer (B) or a mixture of two or more thereof can be used in the context of the present invention as a component of coating materials, in a form suitable for this purpose, in particular as polymer dispersions.

In addition to said components (A) or (B), such coating materials contain additives (C) suitable for their field of use, such as polymers, in particular crosslinking agents, crosslinking catalysts, initiators, in particular pigments, dyes, fillers, reinforcing fillers, rheology assistants, wetting agents and dispersants, antifoams, adhesion promoters, additives for improving substrate wetting, additives for improving surface smoothness, dulling agents, leveling agents, film-forming assistants, drying agents, antiskinning agents, light stabilizers, corrosion inhibitors, biocides, flameproofing agents, polymerization inhibitors, in particular photoinhibitors, or plasticizers, as are customary and known, for example, in the plastics or leather sector. The choice of the additive depends on the desired property profile of the coating material and its intended use.

These coating materials can be applied by the known methods of application of liquid phases, such as dipping, spraying, knife coating, brushing, roller coating or pouring in the form of a liquid curtain. Examples of suitable substrates are films, sheets, fibers, metal sheets, woven fabrics or shaped articles, in particular automotive bodywork components, of metal, glass, wood, paper, plastics, leather, mineral substrates or composite materials thereof. During application, these substrates may be stationary or moving, as, for example, in the coil coating method.

Furthermore, such coating materials may be used in powder form, in particular in powder coating.

In particular, the coating materials may be components of multilayer coat structures, as encountered, for example, in automotive OEM finishing, automotive refinishing, plastics coating, industrial coating, container coating or the coil coating method or in furniture coating.

Use as a Component in Toners

Toner compositions can be prepared by various known methods, for example by mixing together and heating resin particles which contain the components (A) or (B) described herein, for example corresponding styrene/butadiene copolymers, with pigments, such as magnetite, carbon black or mixtures thereof, and colored pigments, such as cyan, magenta, yellow, green, brown or red pigments or mixtures thereof, and preferably from 0.5 to 5% by weight of an additive for increasing the charge in an extrusion apparatus for toners, for example ZSK 53 from Werner & Pfleiderer, and subsequently removing the resulting toner composition from the apparatus. After cooling, the toner composition is milled in a suitable micronizing apparatus in order to obtain toner particles which have a mean diameter of less than about 25 µm, preferably from 6 to 12 µm, these diameters being determined using a Coulter counter. This is followed by classification of the particles, toner particles having a diameter of less than 4 µm being removed.

Details regarding such toner compositions are disclosed, for example, in U.S. Pat. No. 5,322,912, in particular in columns 11 to 15 thereof, the content of which regarding the components of a toner composition are hereby fully incorporated in the context of the present application.

Use as Component in Cosmetics

Reaction products (A) or polymers (B) having film-forming properties are used in cosmetics as film formers for cosmetic, dermatological, hygiene and/or pharmaceutical formulations and are particularly suitable as additives for hair and skin cosmetics.

In the cosmetic and dermatological formulations for the skin, the novel reaction products (A) or polymers (B) are particularly effective. The reaction products (A) or polymers (B) can, inter alia, help to keep the skin moist and to condition it and improve the feel of the skin.

The reaction products (A) or polymers (B) are preferably used for setting and shaping the hair and improving its structure. They increase the combability and improve the feel of the hair. These hair treatment agents generally contain a solution of the film former in an alcohol or a mixture of alcohol and water.

One requirement of hair treatment agents is that they impart, inter alia, gloss, flexibility and a naturally pleasant feel to the hair.

In addition to the novel reaction products (A) or (B) and suitable solvents, the cosmetic, dermatological, hygiene and/or pharmaceutical formulations can also contain conventional additives, such as emulsifiers, preservatives, perfume oils, cosmetic active ingredients, such as phytantriol, vitamins and provitamins, for example vitamin A, E and C, retinol, bisabolol, panthenol, natural and synthetic light stabilizers, natural substances, propellants, solubilizers, repellents, bleaches, coloring compositions, toning compositions, tanning compositions (for example dihydroxyacetone), micropigments, such as titanium oxide or zinc oxide, reflectors, proteins, for example wheat, almond or pea proteins, ceramide, pH-α-hydroxy acids, fruit acids, collagen, protein hydrolysis products, stabilizers, pH regulators, colors, salts, thickeners, gel formers, consistency regulators, silicones, humectants, natural oil replenishers and further conventional additives.

Preferably, the novel reaction products (A) or polymers (B) are used as or in coating material(s) for keratin-containing and keratin-analogous surfaces, such as hair, skin and nails.

In the formulation of hair setting compositions, it should be borne in mind that a reduction of the alcohol and propellant content is required owing to the environmental provisions for controlling the emission of volatile organic compounds (VOC) into the atmosphere.

Particularly suitable reaction products (A) or polymers (B) are those which are water-soluble or whose water dispersibility is so high that they are soluble in a 20:80 (V%/V%) water/ethanol solvent mixture in an amount of more than 0.1, preferably more than 0.2, g/l.

For example, the novel reaction products (A) or polymers (B) are used in cosmetic compositions for cleansing the skin. Such cosmetic cleansing compositions are selected from bar soaps, such as toilet soaps, curd soaps, transparent soaps, luxury soaps, deodorant soaps, cream soaps, baby soaps, skin protection soaps, abrasive soaps and syndets, liquid soaps, such as pasty soaps, soft soaps and wash pastes, and liquid washing, shower and bath preparations, such as wash lotions, shower compositions and gels, foam baths, oil baths and scrub preparations and shaving foams, lotions and creams.

They are particularly suitable for hair cosmetics, preferably in formulations such as hair repair treatments, hair lotions, hair rinses, hair emulsions, split end fluids, neutralizing compositions for permanent waves, hot-oil treatment preparations, conditioners, setting lotions, shampoos, hair dyes or hair sprays.

The skin care compositions are present in particular as W/O or O/W skin creams, day and night creams, eye creams, face creams, antiwrinkle creams, moisturizing creams, bleaching creams, vitamin creams, skin lotions, care lotions and moisturizing lotions.

Depending on the field of use, the cosmetic, hygiene, dermatological and/or pharmaceutical formulations can be applied as spray (pump spray or aerosol), foam, gel, gel spray, lotion or mousse.

They are furthermore suitable for skin cosmetic formulations, such as face lotions, face masks, deodorants and other cosmetic lotions, and for use in decorative cosmetics, for example as a masking pen, theater paint, in mascara and eye shadow, lipsticks, kajal sticks, eyeliners, rouges, powders and eyebrow pencils.

The novel reaction products (A) or polymers (B) can also be used in nose strips for pore cleansing, in antiacne compositions, repellents, shaving composites, depilatories, feminine hygiene compositions and foot care compositions and in baby care.

Furthermore, the novel reaction products (A) or polymers (B) are suitable as excipients in pharmacy, preferably as or in coating composition(s) or binder(s) for solid dosage forms. They can also be used in creams and as tablet coating compositions and tablet binders.

The novel reaction products (A) or polymers (B) are contained in the cosmetic, dermatological or hygiene formulations in an amount of from about 0.001 to 20, preferably from 0.1 to 10, % by weight, based on the total weight of the composition.

Examples of particularly suitable solvents are water and lower monoalcohols or polyols of 1 to 6 carbon atoms and mixtures thereof, preferred monoalcohols or polyols are ethanol, isopropanol, propylene glycol, glycerol and sorbitol.

Further additives which may be present are fatty substances, such as mineral and synthetic oils, for example paraffins, silicone oils and aliphatic hydrocarbons of more than 8 carbon atoms, animal and vegetable oils, for example sunflower oil, coconut oil, avocado oil, olive oil, lanolin or waxes, fatty acids, fatty esters, for example triglycerides of $C_6$- to $C_{30}$-fatty acids, wax esters, such as jojoba oil, fatty alcohols, vaseline and hydrogenated lanolin. Mixtures thereof can of course also be used.

Conventional thickeners in such formulations are crosslinked polyacrylic acid and its derivatives, polysaccharides, such as xanthan gum, agar agar, alginates or tyloses, cellulose derivatives, for example carboxymethylcellulose or hydroxycarboxymethylcellulose, fatty alcohols, monoglycerides and fatty acids, polyvinyl alcohol and polyvinylpyrrolidone.

After the polymerization of the novel reaction products (A) or polymers (B), other polymers can also be admixed if specific properties are to be established.

Examples of conventional polymers suitable for this purpose are anionic, cationic, amphoteric and neutral polymers.

Use as Resin Material

Regarding the use of components (A) and (B) described herein as resin material, reference is made to DE-A 196 36 058, which describes a styrene resin material. It is of course also possible to prepare other resin materials, for example polymers based on acrylic acid/butadiene and acrylic acid/ styrene or acrylic acid/styrene/acrylic acid or copolymers of styrene and acrylonitrile in the same or an analogous manner. Such resin materials are described below using a styrene resin material as an example.

According to the invention, the (co)polymers can be mixed with at least one ether monomer. For example, the polymers described in EP-B 0 512 951, in particular on page 4, line 6 to page 5, line 33, are suitable for this purpose.

If desired, the resin material may contain lubricants, antistatic agents, antioxidants, heat stabilizers, ultraviolet absorbers, pigments, dyes, nucleating agents, rubbers, fillers, dulling agents, brightening compositions, flameproofing agents, blowing agents, mold release agents and the additives and plasticizers, such as mineral oil, which are mentioned in WO 97/27233, page 5, line 1 to page 5, line 37 and in EP-B 0 512 95 1, page 6, lines 6–21 and page 7, lines 23–41.

According to the invention, the polymers stated in the present application are used for processing to give moldings, sheets, fibers and foams. The rheological and thermal behavior is critical for the performance characteristics and processing properties. To ensure as far as possible trouble-free processing, it is important to keep the melt viscosity low, so that the polymers mentioned here, which have a low viscosity, are particularly suitable.

Before they are processed to give moldings, sheets, fibers and foams, the polymers are generally mixed with additives which are useful for modifying the basic properties (modifiers, plasticizers, fillers and reinforcing materials, flameproofing agents, antistatic agents, dyes, pigments, etc.) or for carrying out the processing in a trouble-free manner (stabilizers, lubricants, mold release agents, etc.). The novel polymers used can also be employed as a mixture with other polymers, such as polyethylene terephthalate (PET), polybutylene terephthalate (PBT), polycarbonate (PC), polyamide (PA 6), polyamide 66 (PA 66), polyamide 12 (PA 12), polyamide 4,6 (PA 4,6), copolyamides, polypropylene oxide (PPO), polyetherimides, polyetherketones, polyimides, acrylonitrile/butadiene/styrene (polymers) (ABS), acrylonitrile/styrene/acrylate (polymers) (ASA), poly(amidoimides), polybutadiene, poly(meth)acrylate, epoxy resins, polyethylene (PE), polypropylene (PP), EPDM (ethylenepropylene-diene monomer rubber), copolymers of α-olefins, polyvinyl chloride (PVC), polymethyl methacrylate (PMMA), polystyrene (PS), styrene/acrylonitrile copolymers (SAN), polyvinyl alcohol, polyvinyl acetate, thermoplastic polyurethane elastomers (TPU), polylactide, and polymers described in chapter 5 of Polymer Handbook, 3rd ed., Brandrup, J. and Immergut, E H, published by John Wiley & Sons, 1989, New York, and their blends and copolymers and block copolymers. Further suitable additives and polymers are known to those skilled in the art.

a) Compounding

The additives and further polymers are generally introduced with the polymer mentioned here by compounding prior to processing, and the starting materials are converted into a form ready for processing. Suitable compounding methods are mixing, if required subsequent roll-milling and kneading (plasticization) and, if required, subsequent granulation.

b) Processing

The moldings, sheets, fibers and foams can be produced by various methods. In general, the polymers mentioned according to the present application can be processed by means of any conventional method to give moldings, sheets, fibers and foams. Suitable methods are described below.

Processing Methods at Atmospheric Pressure

Processing methods at atmospheric pressure which are suitable, for example, for processing low-viscosity melts are casting, for example monomer casting and film casting, dipping, for example paste dipping, brushing and expansion.

Processing Under Pressure

In processing under pressure, a melt is first produced by the action of heat and is then molded and is set by cooling. Suitable processing methods under pressure are pressing as well as rolling and calendering, multistage roll mills with additional apparatuses being required for shaping (melt rolling method, calendering), extrusion, by means of which, for example, continuous semifinished products, such as pipes, tubes, profiles, sheets, films, wire sheets, monofils, etc. and, after the extrusion process, hollow articles can be produced, and blow molding methods for the production of closed hollow articles (e.g. toys), or hollow articles open at one end (e.g. bottles, containers) from tubular parisons, for example the abovementioned extrusion blow molding method and injection blow molding method. A further important processing method under pressure is injection molding, which permits the production of a multiplicity of complicated shapes.

The processing is preferably carried out by extrusion, blow molding and injection molding, particularly preferably by injection molding.

In the processing of polymers by extrusion or blow molding, it is advantageous if the polymers used have a low shear viscosity in the melt, i.e. the shear viscosity of the polymers during the melting in the extruder at high temperatures is low. In comparison, the shear viscosity at lower temperatures, when the molding material leaves the extruder, should be of the conventional order of magnitude.

During the processing of the polymers mentioned in the present application by injection molding, it is advantageous that the polymers have a low viscosity in the melt.

c) Forming

The processing can, if required, be followed by a forming method. The non-cutting forming of semifinished products by the application of external forces and heat serves for increasing the strength or for changing the shape. Suitable forming methods are, for example, orientation (stretching) and heat setting, e.g., deep drawing, by means of which semifinished products can be converted into sheets and tiles. The forming is preferably carried out by deep drawing.

Use as Retention Aid for Papermaking

The components (A) and (B) described herein can also be used as retention aids in the production of all paper grades and cardboards. In this context, reference is made to DE 197 19 059 and the paper grades and cardboards described therein.

These components are preferably suitable for use in the production of paper from sulfite or sulfate pulp in the bleached or unbleached state, it being possible for this fiber material to contain up to 100% by weight of groundwood and/or waste paper and therefore to have a high proportion of mineral fillers, pigments and fibrous crill.

The components (A) and (B) are added to the paper stock dispersion in an amount of from 0.1 to 10, preferably from 0.5 to 5, particularly preferably from 1.0 to 3, % by weight, based on the dry solids content, upstream of the head box of the paper machine. The addition is made to the dispersion which may contain or to which has been added, as fillers, calcium carbonate, kaolin, aluminum silicate and hydrated aluminum oxides, satin white, talc, gypsum, barite, calcium silicate and lithopone, kieselguhr and synthetic, organic fillers from the recycled material.

The components (A) and (B) are advantageously added to the stock dispersion in the headbox, upstream of the vertical screen and upstream or downstream of the stock pump, prior to sheet formation.

By using the components (A) and (B), excellent retention of the fillers is achieved and surprisingly impairment of the strength values is avoided in spite of the increase in the filler and hence in the ash content of the paper. This is particularly true for the use of stock dispersions which contain waste paper or mechanical pulps, such as groundwood and thermomechanical pulp (TMP), or consist thereof It was also found that, by using the components (A) and (B), the effect of optical brighteners, which are added to improve the whiteness of the paper stock, is not adversely affected.

Use as Solubilizer in Pharmaceutical and Cosmetic Formulations

The components (A) and (B) described herein can also be used as solubilizers in pharmaceutical and cosmetic formulations.

Pharmaceutical and cosmetic formulations can be obtained by processing the components (A) and/or (B) with pharmaceutical or cosmetic active ingredients by conventional methods and with the use of known active ingredients.

The pharmaceutical or cosmetic active ingredients used are substances which are is sparingly soluble in water and have a water solubility of 10 g/l or less. The active ingredients may be from any area of indications. Examples here are benzodiazepines, antihypertensive drugs, vitamins, cytostatic drugs, anaesthetics, neuroleptic drugs, antidepressants, antibiotics, antimycotic drugs, fungicides, chemotherapeutic drugs, urological drugs, platelet aggregation inhibitors, sulfonamides, spasmolytic drugs, hormones, immunoglobulins, sera, thyroid therapeutics, psychotropic drugs, antiparkinson drugs and other antihyperkinetic drugs, ophthalmic drugs, neuropathic preparations, calcium metabolism regulators, muscle relaxants, narcotics, lipid depressants, hepathotherapeutic drugs, coronary drugs, cardiac drugs, immunotherapeutic drugs, regulatory peptides and their inhibitors, hypnotics, sedatives, gynecological drugs, gout remedies, fibrinolytic drugs, enzyme preparations and transport proteins, enzyme inhibitors, emetics, drugs for stimulating blood flow, diuretics, diagnostic agents, corticoids, cholinergics, drugs for treatment of the biliary ducts, antihistamines, broncholytics, beta receptor blockers, calcium antagonists, ACE inhibitors, arteriosclerotic drugs, antiphlogistic drugs, anticoagulants, antihypotensive drugs, antihypoglycemic drugs, antihypertensive drugs, antifibrinolytic drugs, antiepileptic drugs, antiemetics, antidotes, antidiabetic drugs, antiarrhythmic drugs, antianemic drugs, antiallergic drugs, anthelmintics, analgesics, analeptic drugs, aldosterone antagonists and slimming preparations.

The novel compounds are used as solubilizers in a known manner For example, the active ingredient is mixed with them and water is added, if required with gentle heating, or the novel compounds are dissolved in water, if required with gentle heating, with simultaneous or subsequent addition of active ingredient.

Use as Incrustation Inhibitor and/or Soil Release Polymers in Detergents

The components (A) and/or (B) described herein, preferably copolymers of the type described above which have been rendered hydrophobic, can also be used as incrustation inhibitors and/or soil release polymers in detergents. Regarding the general formulation of such detergents and the function as incrustation inhibitor and/or soil release polymer, reference may be made to DE-A 196 08 044.

The components (A) and/or (B), preferably in a form rendered hydrophobic, are used as incrustation-inhibiting additives in amounts from 0.01 to 20% by weight in detergent powders. Their proportion of the textile detergent powders is generally from 0.05 to 15% by weight.

Cleaning agents are to be understood as meaning, for example, cleaners for hard surfaces, for example for metal, plastics, glass and ceramic cleaning, floor cleaners, sanitary cleaners, general-purpose cleaners in the household and in commercial applications, industrial cleaners (for use in car washes or high-pressure cleaners), cold cleaners, dishwashing agents, rinse aids, disinfectant cleaners, cleaners for the food and beverage industry, in particular as bottle cleaners, as CIP cleaners (cleaning-in-place) in dairies, breweries and other facilities of food manufacturers. Cleaners which contain the polymerization mixtures to be used according to the invention are particularly suitable for cleaning hard surfaces, such as glass, plastics and metal. The cleaners may be alkaline, acidic or neutral. They usually contain surfactants in amounts from about 0,2 to 50% by weight. These may be anionic, nonionic or cationic surfactants or mixtures of surfactants which are compatible with one another, for example mixtures of anionic and nonionic or of cationic and nonionic surfactants. Alkaline cleaners may contain sodium carbonate, potassium carbonate, sodium bicarbonate, potassium bicarbonate, sodium sesquicarbonate, potassium sesquicarbonate, sodium hydroxide, potassium hydroxide, amine bases, such as monoethanolamine, diethanolamine, triethanolamine or ammonia, or silicate in amounts of up to 60% by weight and in some cases even up to 80% by weight. The cleaners may furthermore contain citrates, gluconates or tartrates, in amounts of up to 80% by weight. They may be present in solid or liquid form.

The components (A) and/or (B) to be used according to the invention may be considered as cobuilders. Since they significantly reduce the incrustation during the washing of textiles, they may also be referred to as incrustation inhibitors. The detergents may be present in powder form or as a liquid formulation. The composition of the detergents and cleaning agents may be very different. Washing and cleaning formulations usually contain from 2 to 50% by weight of surfactant and, if required, builders. These data apply both to liquid detergents and to detergent powders. Detergent and cleaning agent formulations which are commonly used in Europe, the USA and in Japan are listed, for example, in a table in Chemical and Engn. News, 67 (1989), 35. Further data on the composition of detergents and cleaning agents can be obtained from Ullmanns Enzyklopädie der technischen Chemie, Verlag Chemie, Weinheim 1983, 4th edition, pages 63 to 160.

Reduced-phosphate detergents are to be understood as meaning those formulations which contain not more than 25% by weight of phosphate, calculated as pentasodium triphosphate. The detergents may be heavy-duty detergents or special detergents. Suitable surfactants are both anionic and nonionic surfactants and mixtures of anionic and nonionic surfactants. The surfactant content of the detergents is preferably from 8 to 30% by weight.

The surfactants present may be both anionic and nonionic surfactants, reference being made to the abovementioned DE-A 196 08 044 with regard to individual anionic and/or nonionic surfactants which may be used.

In addition, the detergents in powder or granular form and possibly also structured liquid detergents contain further components customary in detergents, for example one or more inorganic builders, bleaches, enzyme systems, soil release polymers and/or antiredeposition inhibitors, reference likewise being made to DE-A 196 08 044 in this context for further details on these components.

In connection with soil release polymers, it should be mentioned here that the polymers (B) described herein are also particularly suitable owing to the possibilities of modifying them in a virtually freely selectable manner with regard to their properties in the preparation process described here. For example, it is preferable to use in particular amphiphilic graft polymers or copolymers as described herein, amphiphilic graft polymers or copolymers of vinyl esters and/or acrylates on polyalkylene oxides being mentioned in particular.

Use as Filtration Aid, for Clarifying Beverages

The components (A) and/or (B) described herein can also be used as filtration aids and for clarifying beverages. In this context, reference may be made to EP-B 0 351 363, the content of which is hereby incorporated in full by reference in the context of the present specification. In this context, reference may be made in particular to the section from column [lacuna], line 10 to column 6, line 29 of this publication.

It is particularly advantageous to meter the filtration aid, i.e. the components (A) and (B) described herein, continuously into the unfiltered material. This can be realized in particular by metering in one operation or by metering in the crossflow circulation. It is advantageous if the stabilizer is pumped with the circulation of unfiltered material through the membrane filter of the crossflow filtration unit. The circulation may be closed directly from the outlet of the filtration unit via a pump back to the inlet thereof. However, it is also possible to close the circulation via the working tank, i.e. to pump the unfiltered material continuously from the working tank through the membrane filter and to transport the retentate present at the outlet of the filtration unit, together with the stabilizer contained therein, back into the working tank. Owing to the small pore size of such crossflow membrane filters (from 0.001 to 1 $\mu$m in the case of ultrafiltration or from about 0.1 to 1 $\mu$m in the case of microfiltration), the entry of bound or precipitated tannins or proteins into the filtrate is reliably prevented. Instead, these are circulated with the retentate on the unfiltered material side of the membrane filter until the end of a filtration cycle.

The filtration aid may be metered in without recovery and removed from the filtration unit together with the sediments after the end of a filtration cycle. Polyvinylpolypyrrolidone (PVPP) and further block copolymers described herein and silica gel have proven particularly useful.

If the unfiltered material contains large amounts of suspended matter, the filtration performance of the membrane filters can be increased if granular or fibrous filtration aids are fed to the membranes for protecting the membrane pores from blockage by sediments Granular is understood as describing those filtration aids which consist of regularly or irregularly shaped particles which neither dissolve in the unfiltered material nor agglomerate or are otherwise compacted under the influence of the transmembrane pressure. According to the invention, filtration aids consisting of such granular particles are deposited in spite of the crossflow along the membrane surface and can thus prevent the formation of continuous top layers of sediments.

The filtration aid can advantageously be applied as a top layer directly on the membrane surface. Consequently, the pores of the membrane surface are reliably protected from blockage by sediments. The top layer should have a layer thickness of 1 to 20 $\mu$m, preferably from 1 to 8 $\mu$m; it therefore does not constitute a filter layer in the conventional sense but a protective layer for the actual membrane filter layer.

The filtration aid can be applied to the membrane surface before the beginning of the filtration process. This produces a top layer which consists exclusively of the filtration aid and is free of contamination by sediments. This can be achieved if first a medium which contains no substantial amounts of suspended matter is caused to flow across the membrane in order to start up a filtration cycle, if filtration aid is added to the medium in order to form the top layer and if the unfiltered material is then fed to the membrane. Such a top layer can be easily produced if the filtration cycle is started up with water to which filtration aid is added. As soon as the top layer has been produced, the water can be forced out of the filter as a forward flow and unfiltered material can be fed in.

In many applications, it may be advantageous if the filtration aid is added to the unfiltered material. If, owing to the suspended matter present in the unfiltered material, there is no pronounced tendency to rapid formation of top layers comprising sediment, the filtration cycle can be started up in this way. A top layer of the filtration aid then forms, in which certain amounts of sediment are incorporated. Alternatively, however, it is also possible, after the formation of a top layer comprising filtration aid, also to add filtration aid continuously or batchwise to the unfiltered material after the startup with water or filtrate. The particles of the filtration aid disturb any sediment layers so that they become more permeable. Moreover, the granular filtration aid prevents the formation of compact layers, so that the crossflow can more readily dissolve sediment deposits.

The protection of the membrane pores from blockage is ensured in a particularly reliable manner if filtration aid having a particle size which is greater than the pore size of the filter membrane is applied. A particle size of from 1 to 80 $\mu$m has proven particularly useful, and, by an appropriate choice of the particle size distribution, for example from 60 to 80% of the particles in the range from 1 to 4 $\mu$m, it is possible to optimize the filtration aid in this range with respect to the medium to be filtered and the suspended matter contained therein, Particularly good permeability and a large filtration surface can be achieved if kieselguhr is used as filtration aid.

Regarding further details, reference may be made to EP-B 0 351 363, as stated above.

Use as Components in Disinfectants

Regarding this use, reference may be made herein to EP-A 0 756 820, which relates to the use of dextrins in disinfectants. However, these dextrins alone are not capable of forming sufficiently stable iodine complexes. Surprisingly, however, they can do so when mixed with the reaction products (A) or the polymers (B) described herein, since these copolymers are likewise capable of taking up iodine, and are able to do so with a bond force comparable to that of dextrin, for example homopolyvinylpyrrolidones and block copolymers of N-vinylpyrrolidone and styrene, methyl methacrylate, methyl acrylate, hydroxymethyl acrylate or hydroxyethyl acrylate.

The disinfectants resulting therefrom have improved stability and consequently also improved properties with respect to the disinfectant action.

The formulations can be used in the form of ointments, solutions, shampoos, creams, soaps, gels or suppositories and in gelatin capsules, gargling solutions, sprays or sticks, such as lipsticks. Formulations having a pH of from 1 to 8, preferably from 2 to 7 and particularly preferably from 3 to 6, are preferred.

According to the invention, it is also possible to prepare tablets of a dextrin-containing iodophor. A particular advantage of this is that, surprisingly, the iodophor, in contrast to known iodophors, is directly tabletable, i.e. can be compressed into tablets without further tablet binders. In this way, binder-free iodophor tablets can be obtained in a simple and economical manner. If desired, small amounts of additives, such as lubricants, for example polyethylene glycols or fatty acid salts, such as magnesium stearate, can also be incorporated into the tablets, as can disintegrants, for example crospovidone.

Effervescent tablets comprising dextrin-containing iodophor and alkali metal and/or alkaline earth metal bicarbonates or carbonates are particularly advantageous. Because the tablet floats, the active substance can be more uniformly distributed in the water without stirring being necessary. This is particularly advantageous if relatively large amounts of water are to be treated, for example in drinking water treatment or in fish farming.

The dextrin-containing iodophors can also be processed to give pellets or granules without binders having to be added.

The tablets, pellets or granules can also be prepared as sustained-release preparations having coats which dissolve slowly.

The formulations are suitable in particular for use in the coarse disinfection of surfaces as well as fine disinfections. Thus, they can be used in compositions for the antiseptic treatment of skin and mucous membranes or for disinfecting hands for surgical and hygiene purposes.

The novel formulations are furthermore suitable for the preparation of compositions for the treatment of skin disorders, such as decubitus, varicose ulcers, dermatomycoses, pyodermia, acne and vaginitis, and for the treatment of burn wounds.

Furthermore, the novel formulations can be used in the area of veterinary medicine, for example for disinfecting equipment, for udder disinfection, in fish breeding, for example for disinfection of fish eggs, for disinfecting animal sheds, especially in chicken rearing, in particular in egg laying. They are also suitable for the preparation of drugs for the treatment of diarrhea in animals.

Particularly when used in veterinary medicine or in animal breeding, it is advantageous to use tablets, granules or pellets. These forms are more readily meterable than powders, avoid dust contamination and can be administered directly or can be simply mixed with feed.

Use as Elastomeric Binders in Printing Plates

In this context, reference may be made to DE 2980246.8.

Examples of suitable elastomeric binders are elastomeric polymeric binders, for example polyalkadienes, vinylaromatic/alkadiene copolymers and block polymers, alkadiene/acrylonitrile copolymers, ethylene/propylene copolymers, ethylene/propylene/alkadiene copolymers, ethylene/acrylic acid copolymers, alkadiene/acrylic acid copolymers, alkadiene/acrylate/ acrylic acid copolymers and ethylene/(meth) acrylic acid/(meth)acrylate copolymers, in each case prepared as described above.

Elastomers which contain conjugated alkadienes, such as butadiene or isoprene, and styrene are very particularly suitable. The elastomeric binder is contained in the photopolymerizable cylinder layer in an amount of from 50 to 95, preferably from 50 to 90, % by weight based on the total amount of the components contained in the cylinder layer.

Furthermore, the photopolymerizable relief-forming cylinder layer used according to the invention contains conventional and known copolymerizable ethylenically unsaturated organic compounds which are compatible with the polymeric binder, in an amount from 1 to 60, advantageously from 2 to 50, in particular from 3 to 40, % by weight, based on the total amount of the cylinder layer. The term compatible indicates that the relevant monomers are miscible with the elastomeric binder so readily that no haze or waviness is produced in the relevant photopolymerizable relief-forming cylinder layer. Examples of suitable monomers are the conventional and known acrylates and methacrylates of monohydric and polyhydric alcohols, acrylamides and methacrylamides, vinyl ethers and vinyl esters, allyl ethers and allyl esters and diesters of fumaric acid or of maleic acid, in particular the esters of acrylic and/or methacrylic acid with monohydric or preferably polyhydric alcohols, for example esters of acrylic or methacrylic acid with ethanediol, propanediol, butanediol, hexanediol, oxaalkanediols, for example diethylene glycol, or esters of acrylic or methacrylic acid with trihydric or polyhydric alcohols, such as glycerol, trimethylolpropane, pentaerythritol or sorbitol, for example. Examples of particularly suitable mono- and polyfunctional acrylates or methacrylates are butyl acrylate, butyl methacrylate, 2-ethylhexyl acrylate, lauryl (meth)acrylate, hexanediol diacrylate, hexanediol dimethacrylate, ethylene glycol di(meth)acrylate, butanediol 1,4-di(meth)acrylate, neopentylglycol di(meth)acrylate, 3-methylpentanediol di(meth)acrylate, 2-hydroxypropyl (meth)acrylate, 2-hydroxyethyl (meth)acrylate, 1,1,1-trimethylolpropane tri(meth)acrylate, di-, tri- and tetraethylene glycol di(meth)acrylate, tripropylene glycol di(meth)acrylate or pentaerythrityl tetra(meth)acrylate, and furthermore poly(ethylene oxide) di(meth)acrylate, ω-methylpoly(ethylene oxide)-α-yl-(meth)acrylate, N,N-diethylaminoethyl acrylate, a reaction product of 1 mol of glycerol, 1 mol of epichlorohydrin and 3 mol of acrylic acid, and glycidyl methacrylate and bisphenol A diglycidyl ether acrylate.

Mixtures of photopolymerizable ethylenically unsaturated organic compounds and, for example, mixtures of monofunctional (meth)acrylates, such as hydroxyethyl methacrylate, with polyfunctional (meth)acrylates of the abovementioned type are also suitable.

In addition to the (meth)acrylates, derivatives of (meth) acrylamides, for example N-methylol(meth)acrylamidoethers of polyols (for example glycol), are also suitable.

In addition to the elastomeric binder and copolymerizable ethylenically unsaturated monomeric compounds the cylinder layer crosslinkable by actinic radiation (=photosensitive recording layer) contains one or more photoinitiators, for example benzoin or benzoin derivatives, such as benzoin ethers of straight-chain or branched monoalcohols of 1 to 6 carbon atoms, for example benzoin methyl, ethyl, isopropyl, n-butyl or isobutyl ether, symmetrically or asymmetrically substituted benzil acetals, such as benzil dimethyl acetal, benzil 1-methyl 1-ethyl acetal, diarylphosphine oxides, such as 2,4,6-trimethylbenzoyldiphenylphosphine oxide or 2,6-dimethoxybenzoyldiphenylphosphine oxide or acyldiarylphosphine oxides according to German Laid-Open Application DE-OS 2,909,992, or hydroxypropanones, such as 1-phenyl-2-methyl-2-hydroxy-1-propanone and 1-hydroxycyclohexyl phenyl ketone. They may be used alone or as a mixture with one another or in combination with coinitiators, for example benzoin methyl ether with triphenylphosphine, diacylphosphine oxides with tertiary amines or acyldiarylphosphine oxides with benzil dimethyl acetal.

In the mixtures they are used in an amount from 0.001 to 10, advantageously from 0.1 to 5, in particular from 0.3 to 2, % by weight, based on the total amount of the photosensitive cylinder layer, the amount being determined by, inter alia, the presence of photopolymerizable monomers.

Thermal polymerization inhibitors which have no significant self-absorption in the actinic range in which the photoinitiator absorbs can be added as further assistants which may be present, in general in an amount from 0.001 to 2% by weight, based on the total amount of the photosensitive cylinder layer, for example 2,6-di-tert-butyl-p-cresol, hydroquinone, p-methoxyphenol, β-naphthol, phenothiazine, pyridine, nitrobenzene, m-dinitrobenzene or chloranil; thiazine dyes, such as thionine blue G (C.I. 52025), methylene blue B (C.I. 52015) or toluidine blue (C.I. 52040); or N-nitrosamines, such as N,N-nitrosodiphenylamine, or the salts, for example the potassium, calcium or aluminum salts, of N-nitrosocyclohexylhydroxylamine.

Suitable dyes, pigments or photochromic additives may also be added to the photosensitive mixture of the recording layer, in an amount from 0.0001 to 2% by weight, based on the mixture.

The preparation of the photopolymerizable relief-forming cylinder layer used according to the invention from its components is carried out in general by mixing the components with the aid of known mixing methods or by processing the mixture for the IR-sensitive layer with the aid of known techniques, such as casting from solution, calendering or extrusion, it also being possible for these measures to be combined with one another in a suitable manner.

The cylinder layer crosslinkable by actinic radiation generally has a thickness of from 200 to 8000 $\mu$m, in particular from 500 to 6000 $\mu$m. A further thin layer which may have a thickness of from 1 to 5 $\mu$m and which detackifies the surface of the photosensitive cylinder layer may be applied thereon. Present on the latter or preferably directly on the cylinder layer crosslinkable by actinic radiation is the IR-sensitive layer, which is a layer which is soluble or dispersible in developers and contains, in a film-forming binder having elastomeric character, at least one finely divided substance which has high absorption in the wavelength range from 750 to 20,000 nm and an optical density $\geq 2.5$ in the actinic range. Developers may be water and water/alcohol or organic solvent (mixtures). Suitable binders having elastomeric character for the IR-sensitive layer are polymers, in particular copolymers, which are either water-soluble or dispersible in water or water/alcohol mixtures or those which are soluble or dispersible in organic solvents or solvent mixtures. Suitable alcohols in the water/alcohol mixtures are methanol, ethanol, n-propanol and isopropanol.

Examples of binders which are soluble or dispersible in water or in water/alcohol mixtures and have elastomeric character are polyvinyl alcohol/polyethylene glycol graft copolymers (for example Mowiol® 597 from Hoechst Aktiengesellschaft, Germany), which are obtainable by grafting vinyl acetate onto polyehtylene glycol having molecular weights of from 1000 to 50,000 and then carrying out hydrolysis to a degree of hydrolysis of from 90 to 100%.

Examples of binders which are soluble or dispersible in organic solvents or solvent mixtures and have elastomeric character are thermoplastic polyamide resins which can be prepared, for example, by conventional polycondensation and are marketed, for example, under the name Macromelt® by Henkel KGaA, Germany. All of the abovementioned products are described in detail in the respective relevant company publications.

The film-forming binders having elastomeric character and present in the IR-sensitive layer contain finely divided substances which have a high absorption in the IR range. Examples of such substances are various finely divided carbon black grades, for example pigment black FW2000, special black 5, Printex® U from Degussa Aktiengesellschaft, Germany, having a mean primary particle size of from 13 to 30 nm. Advantageously used solutions are those which contain binders having elastomeric character and substances having high IR absorption, which solutions are either applied uniformly and directly onto the cylinder layer and dried or cast to give a film, dried and laminated with the cylinder layer. The film can, if required, be peeled off.

It is also possible to apply a peelable film transparent to actinic light, a cover sheet which has a thickness of from 5 to 300 $\mu$m, which consists, for example, of polyethylene or polyethylene terephthalate, to the IR-sensitive layer.

Synthetic oligomers or resins, such as oligostyrene, oligomeric styrene/butadiene copolymers, oligomeric α-methylstyrene/p-methylstyrene copolymers, liquid oligobutadienes, liquid oligoisoprenes or liquid oligomeric acrylonitrile/butadiene copolymers, each prepared as described above, may also be used. Such oligomers are molecules having a molecular weight of from 500 to 5000 g/mol.

Use as Dispersants, Preferably as Dispersants in Inkjet Pigment Formulations

The components (A) and (B) described here are extremely useful for the preparation of aqueous dispersions and perform the function of a dispersant. In this context, reference may be made to DE-A 100 05 648.

If components (A) and (B) are used as dispersants, then, for example, aqueous dispersions which have excellent long-term stability can be obtained therefrom. Depending on the intended use of the dispersions thus obtainable, the amount of these components in the total aqueous dispersion can vary within wide ranges. If the components are used, for example, as dispersants for stabilizing a dispersion which contains a solid which is not self-dispersible, the amount of the novel compounds used may be from about 0.01 to about 40, for example from about 0.1 to about 20 or from about 0.5 to about 10 or from about 1 to about 5, % by weight. The amount of solids in such a dispersion can vary over a wide range. Depending on the intended use, it is therefore possible to use the novel compounds to obtain dispersions which have a solids content of up to about 99% by weight. Particularly when such dispersions are to be used for coating surfaces, they preferably have a solids content of from about 30 to about 95, for example from about 40 to about 90 or from about 50 to about 80, % by weight.

The present invention therefore also relates to aqueous dispersions, at least containing one of the components (A) and (B).

In a further preferred embodiment, however, these components are also suitable as the sole component of such a dispersion, in particular as the disperse phase of an aqueous dispersion. Such dispersions can be used, for example, as coating materials for the production of surface coatings. When used in this manner, it is advantageous if the component used is a compound which, after removal of the continuous phase, gives a surface coating which corresponds to the user's requirements. When used in this manner, it is therefore preferable, according to the invention, if the novel compound used is a compound having a molecular weight of at least about 1000.

In addition to water and one of the components, or a mixture of two or more thereof, the novel aqueous dispersions may also contain one or more further compounds.

If the novel aqueous dispersion is to be used as a surface coating material, the dispersion may contain, for example, at least one polymer which is obtainable by polymerization of monomers having ethylenically unsaturated double bonds. Suitable monomers are, for example, acrylic acid, methacrylic acid, acrylonitrile, acrylates or methacrylates, as obtainable by esterifying acrylic acid or methacrylic acid with methanol, ethanol, n-butanol, isobutanol, or 2-ethylhexyl alcohol, vinyl esters of carboxylic acids of 1 to 16 carbon atoms or 1-alkenes, such as ethylene, propylene or butylene, or styrene. Such polymers may, for example, already be in dispersed or at least polymerized form when mixed with the novel dispersion. However, it is also possible to prepare said polymers in the novel aqueous dispersion. Here, the respective compounds and reaction conditions can be chosen so that, for example, at least a part of the polymers produced in the dispersion are added, by means of a grafting reaction, to the novel compounds present in the dispersion.

Corresponding polymers are prepared by methods known to those skilled in the art, as described, for example, in D. C. Blackley, Emulsion Polymerization—Theory and Practice, London, Applied Science Publishers, 1975, or in H. Warson, Application of Synthetic Resin Emulsions, London, Benn Publishers, 1972, or in I. Piirma, Emulsion Polymerization, New York, Academic Press Inc., 1982.

The novel dispersions may furthermore contain additives, such as organic solvents, pigments, dyes, emulsifiers, surfactants, thickeners, stabilizers, leveling agents, fillers, sedimentation inhibitors, flameproofing agents, UV stabilizers or antioxidants.

Suitable solvents are, for example, acetone, methyl ethyl ketone, tetrahydrofuran, dimethylformamide, dimethylacetamide, dioxane, ethyl acetate and the like, or a mixture of two or more thereof. The novel dispersions may contain the organic solvents in an amount of up to about 20, preferably up to about 10, % by weight.

Other suitable thickeners in addition to the novel components (A) and (B) themselves are polymers of hydrophilic monomers capable of free radical polymerization, such as acrylic acid or methacrylic acid, polyvinylpyrrolidone or thickeners based on cellulose or starch derivatives, such as carboxymethylcellulose, carboxyethylcelluse, hydroxyethylcellulose, hydroxypropylcellulose, hydroxyethyl starch, hydroxypropyl starch and the like, Said thickeners may each be present individually or as a mixture of two or more thereof in the novel dispersions.

Suitable fillers or pigments are, for example, titanium dioxide, antimony oxide, zinc oxide, basic lead carbonate, basic lead sulfate, barium carbonate, porcelain powder, clay, aluminum silicate, silica, magnesium carbonate, magnesium silicate or calcium carbonate. For example, cadmium yellow, cadmium red, carbon black, phthalocyanine blue, chromium yellow, toluidyl red and hydrated iron oxide may be used as colored pigments.

The novel dispersions are prepared by generally customary methods known to those skilled in the art. Suitable methods are described, for example, in Kunststoffhandbuch, No. 7, Polyurethane, Carl Hanser Verlag, 1993.

The novel aqueous dispersions can be used in particular as surface coating materials. In this respect, they may be combined with a multiplicity of substrates. Examples of suitable substrates are wood, metal, glass, textiles, leather, paper, plastics and the like. The novel aqueous dispersions can be applied by any desired, conventional methods, such as dipping, spraying, knife coating, brush application or the like.

The present invention furthermore relates to the use of at least one of the components (A) and (B) as wetting agents, dispersants, surfactants, adhesion promoters, assistants in electroplating baths, acid catalysts in chemical syntheses or curing components in coating materials.

The novel polymeric dispersants, as an individual substance or as a mixture, are particularly suitable for wetting, dispersing and stabilizing pigments in aqueous or solvent-containing suspensions. It has been found that the novel dispersants lead to good fixing of the pigments on, in particular, cellulosic fibers, which is confirmed by excellent wet and dry abrasion resistances. The pigments can be selected from among colored pigments or magnetic pigments.

Regarding this use, reference may be made to DE-A 19842952.5, which is hereby fully incorporated by reference in the context of the present application.

This publication also lists, for example, suitable pigments, such as monoazo pigments, diazo pigments, vat dyes, inorganic pigments and magnetic pigments.

Expediently, the pigments are first converted with the novel dispersant into a suitable form for use, a pigment formulation. The pigment formulations can be used directly, for example as print paste or ink, or can be used for the preparation of a form for use, for example a writing ink or inkjet ink. The pigment formulations can be incorporated into aqueous or organic systems simply and without undesirable flocculation. For the preparation of the pigment formulations, the pigments are mixed with the novel dispersants and, if desired, further additives in the presence of a diluent, such as water. For liquid preparation, in which the pigment is finely distributed in the presence of relatively large amounts of diluent, in particular dissolvers for predispersing and stirred ball mills are suitable, such as bead mills generally and those having small grinding beads (having, for example, a diameter of 0.3 mm), such as the double-cylinder bead mills (DCP-Super Flow®) from Draiswerken GmbH, Mannheim, or the centrifugal fluidized-bed mills (ZWM) from Netzsch Gerätebau GmbH, Selb. In this way, finely divided and low-viscosity pigment formulations are obtained. Compared with conventional dispersants, the novel dispersant leads to advantageously high flowabilities and stable storage behavior. When pigment formulations prepared using the novel dispersant were stored, no settling of the pigment was observed over months.

Moreover, the novel dispersant can be used universally for a multiplicity of different pigments.

Alternatively, the pigment can be processed with the dispersant, with or without heating, to give a plastic material. Mixers and plasticating apparatuses, such as kneaders, extruders and/or roll mills, are particularly suitable for this purpose.

The pigment contained in the pigment formulation after dispersing should be very finely divided. Preferably 95%, particularly preferably 99%, of pigment particles have a particle size of <1 $\mu$m, preferably <5 $\mu$m.

The novel pigment formulations contain, as a rule, from 0.1 to 35, preferably from 0.1 to 20, particularly preferably from 0.2 to 10, % by weight of pigment.

Water is the main component of the novel pigment formulations. Its content is as a rule from 35 to 90, preferably from 45 to 80, % by weight.

The novel pigment formulations preferably also contain a humectant, reference once again being made here to DE-A 19842952.5 with regard to examples of such humectants. Suitable humectants in addition to polyhydric alcohols, in particular of 3 to 8 carbon atoms, such as glycerol, erythritol or pentaerythritol, are pentitols, such as arabitol, adonitol and xylitol, and hexitols, such as sorbitol, mannitol and dulcitol, especially polyalkylene glycols and polyalkylene glycol monoalkyl ethers, which are also to be understood as meaning the lower (di-, tri- and tetra-)alkylene glycols and alkylene glycol ethers. These compounds preferably have average molecular weights of from 100 to 1500, polyethylene glycols and polyethylene glycol ethers having an average molecular weight of <800 being particularly preferred.

Of course, the novel pigment formulations may contain further assistants, as are customary in particular for (aqueous) inkjet inks and in the printing and coatings industry. Examples which may be mentioned are preservatives (such as 1,2-benzoisothiazolin-3-one and its alkali metal salts, glutardialdehyde and/or tetramethylolethyleneurea), antioxidants, degassers/antifoams (such as acetylenediols and ethoxylated acetylenediols, which usually contain from 20 to 40 mol of ethylene oxide per mole of acetylenediol and at the same time have a dispersant effect, or phosphoric acid/alcohol mixtures), compositions for regulating the viscosity, leveling agents, wetting agents, antisettling agents, gloss improvers, lubricants, adhesion improvers, antiskinning compositions, dulling agents, emulsifiers, stabilizers, water repellents, light-stabilizing additives, handle improvers and antistatic agents. If these compositions are components of the novel pigment formulations, their total amount is as a rule ≦1% by weight, based on the weight of the formulation.

The novel pigment formulations usually have a dynamic viscosity of from 1 to 20, preferably from 1 to 5, mm$^2$/sec.

The surface tension of the novel pigment formulations is as a rule from 20 to 70, preferably from 35 to 60, mN/m.

The pH of the novel pigment formulations is in general from 5 to 11, preferably from 7 to 9.

In the preparation of the novel pigment formulations, it is expedient to proceed as follows:

The pigment, for example in the form of a water-containing press cake or in the form of a dry pigment powder, is mixed together with one or more novel dispersant(s) in the presence of water and predispersed in a suitable apparatus. The mixture obtained is then milled in a mill in order to establish the desired pigment particle size distribution, after which further assistants are added. Finally, the final formulation is prepared by adding corresponding amounts of water and, if required, one or more humectants and, if required, further assistants, mixing and then fixing by means of a filtration apparatus with fines removal in the range from, as a rule, 10 to 1 $\mu$m and preferably then by means of a further filtration apparatus with fines removal in the range from 1 to 0.5 $\mu$m.

The novel pigment formulations can advantageously be used in the likewise novel process for the printing of sheet-like or three-dimensional substrates by the inkjet printing method, wherein the pigment formulations are printed onto the substrate and the print obtained is then fixed.

In the inkjet method, usually aqueous inks in small droplets are sprayed directly onto the substrate. A distinction is made between a continuous method in which the ink is forced uniformly through a nozzle and is guided by an electric field, depending on the pattern to be printed, onto the substrate, and an interrupted inkjet or drop-on-demand method in which the ink is ejected only where a colored dot is to be positioned. In the last-mentioned method, pressure is exerted on the ink system either by means of a piezoelectric crystal or by means of a heated cannula (bubblejet or thermojet method) and an ink droplet is thus forced out. Such procedures are described in Text. Chem. Color, Volume 19 (88), pages 23 to 29, 1987, and Volume 21 (6), pages 27 to 32, 1989.

The novel pigment formulations are particularly suitable as inks for the bubblejet method and for the method by means of a piezoelectric crystal.

The novel pigment formulations can be printed on all types of substrate materials. Examples of substrate materials which may be mentioned are cellulose-containing materials, such as paper, board, cardboard, wood and woodbase materials, which may also have been treated with a finish or otherwise coated, metallic materials, such as foils, sheets or workpieces made of aluminum, iron, copper, silver, gold, zinc or alloys of these metals, which may have been treated with a finish or otherwise coated, silicate materials, such as glass, porcelain and ceramic, which may likewise have been coated, polymeric materials of any type, such as polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers, such as gelatin, textile materials, such as fibers, yarns, thread, knits, wovens, nonwovens and ready-made goods composed of polyester, modified polyester, polyester blend fabrics, cellulose-containing materials, such as cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric, leather, both natural and artificial, in the form of smooth leather, nappa leather or suede leather, food and cosmetics.

The substrate material may be sheet-like or three-dimensional and may be printed with the novel pigment formulations both uniformly and imagewise.

The novel pigment formulations are extremely useful for the production of writing inks and of toners, in particular of aqueous, liquid toners, and of toner powders.

The toners can be produced, for example, conventionally by mixing, kneading, milling and screening pigments with the polymeric dispersants.

Use as Excipients in a Tablet Matrix

The components (A) and (B) described herein are also suitable for formulating active ingredients for drugs, crop protection agents, feeds and foods and also feed supplements and food supplements, fragrances and perfume oils, where the proportion by weight of said components in the final formulation may be from 1 to 99% by weight. It is of course also possible to use mixtures of different components or mixtures of the components with farther polymers and/or different active ingredients.

Possible additional formulation excipients are a) meltable sugar alcohols, sugars, fats and waxes (from 0 to 99%), b) polymers, such as polyvinylpyrrolidone, cellulose derivatives, polyvinylformamide (also partially or completely hydrolyzed), copolymers, polyethylene glycols, starch and starch derivatives, polyacrylates and polymethacrylates (Eudragit types), polyvinyl alcohol, partially hydrolyzed polyvinyl acetate and polyacrylamides (from 0 to 99%), c) if required, assistants such as surfactants, disintegrants, colorants, lubricants or plasticizers, dispersants, fillers or salts and antifoams (from 0 to 99%) or other mixtures.

Other pharmaceutical excipients are added bases or acids for controlling the solubility of an active ingredient.

There are no restrictions at all with regard to the active ingredients which can be formulated with the components described here. Examples which may be mentioned are benzodiazepines, antihypertensive drugs, vitamins, cytostatic drugs, anesthetics, neuroleptics, antidepressants, antibiotics, antimycotic drugs, fungicides, chemotherapeutic drugs, urological drugs, platelet aggregation inhibitors, sulfonamides, spasmolytic drugs, hormones, immunoglobulins, sera, thyroid therapeutics, psychotropic drugs, antiparkinson drugs and other antihyperkinetic drugs, ophthalmic drugs, neuropathic preparations, calcium metabolism regulators, muscle relaxants, narcotics, lipid depressants, hepatotherapeutic drugs, coronary drugs, cardiac drugs, immunotherapeutic drugs, regulator peptides and their inhibitors, hypnotics, sedatives, gynecological drugs, antigout drugs, fibrinolytic drugs, enzyme preparations and transport proteins, enzyme inhibitors, emetics, compositions for promoting blood flow, diuretics, diagnostic drugs, corticoids, cholinergic drugs, drugs for the treatment of biliary ducts, antihistamines, broncholytic drugs, beta receptor blockers, calcium antagonists, ACE inhibitors, arteriosclerotic drugs, antiphlogistic drugs, anticoagulants, antihypotensive drugs, antihypoglycemic drugs, antihypertensive drugs, antifibrinolytic drugs, antiepileptic drugs, antiemetics, antidotes, antidiabetic drugs, antiarrhythmic drugs, antianemic drugs, antiallergic drugs, anthelmintics, analgesics, analeptics, aldosterone antagonists and slimming preparations.

Pharmaceutical and other formulations can be obtained by processing the components (A) and/or (B) with pharmaceutical or other active ingredients by conventional methods and with the use of known active ingredients.

In the preparation of the formulations, it is of course also possible to add further excipients conventionally used in the preparation of solid oral dosage forms. These may be substances from among fillers and binders (for example lactose, calcium phosphates, cellulose and its derivatives, starch, polyvinylpyrrolidone, polyvinylformamide (also partially or completely hydrolyzed), polyvinyl alcohol, partially hydrolyzed polyvinyl acetate, polyacrylamides (from 0 to 99%), sugar alcohols, sugars, fats or waxes (from 0 to 99%)), disintegrants (for example Kollidon C L, according to the claim carboxymethyl starch or carboxymethylcellulose), lubricants (for example magnesium stearate, calcium behenate, stearic acid or PEG), flow regulators (for example finely divided silica), film formers (for example polyacrylates and polymethacrylates (Eudragit types), copolymers based on acrylate derivatives, hydroxypropylmethylcellulose, hydroxypropylcellulose, cellulose acetate, cellulose acetate phthalate and other coating materials resistant to gastric fluid), humectants (for example glycerol, propylene glycol, sorbitol, mannitol or polyethylene glycols), plasticizers, colorants, surfactants, salts and dispersants.

Use as Assistants for Plasticizing Concrete

Regarding this use, reference may be made to DE-A 196 53 524, whose content in this respect is hereby fully incorporated by reference in the context of the present application. Reference may be made in particular to the section of this patent application beginning on page 10, line 51 to page 11, line 37.

The novel components (A) or (B) are extremely useful as additives for cement mixes, such as concrete or mortar. Cement is to be understood as meaning, for example, Portland cement, high-alumina cement or mixed cement, for example pozzolanic cement, slag cement or other types. Portland cement is preferred. The copolymers are used in an amount of from 0.01 to 10, preferably from 0.05 to 3, % by weight based on the weight of the cement.

The components (A) and (B) can be added in solid form, which is obtainable by drying, for example spray-drying, of polymer solutions or dispersions as obtained in the polymerization, to the ready-to-use preparation of the mineral building material. It is also conceivable to formulate the copolymers with the mineral binder and to prepare the ready-to-use preparation of the mineral building materials therefrom. Preferably, the copolymer is used in liquid, i.e.

dissolved, emulsified or suspended, form, for example in the form of the polymerization solution, in the preparation of the mineral building material.

For use in concrete and mortar, it may be advantageous to employ polymers which are converted into a water-soluble and hence active form only in the presence of the alkaline concrete or mortar, for example polymers containing carboxylic acid or carboxylic anhydride structures. The slow release of the active polymer results in a longer-lasting activity.

The novel components (A) and (B) can also be used in combination with the known concrete plasticizers based on the sulfonate of a naphthalene/formaldehyde condensate, the sulfonate of a melamine/formaldehyde condensate, a phenolsulfonic acid/formaldehyde condensate and ligninsulfonates. They can also be used in combination with high molecular weight polyethylene oxides (molecular weight from 100,000 to 8,000,000). Furthermore, they can be used together with celluloses, for example alkyl- or hydroxyalkylcelluloses, starches or starch derivatives. Additives such as air pore formers, expansion compositions, water repellents, setting retardants, setting accelerators, antifreezes, sealants, pigments, corrosion inhibitors, flowability additives, grouting aids, stabilizers and hollow microspheres may furthermore be admixed.

In principle, the novel components (A) and (B) can also be used together with film-forming polymers. These are understood as meaning those polymers whose glass transition temperature (DSC midpoint temperature, ASTM D 3481–82) is $\leq 65°$ C., preferably $\leq 50°$ C., particularly preferably 25° C., very particularly preferably $\leq 0°$ C. On the basis of the relationship between the glass transition temperature of homopolymers and the glass transition temperature of copolymers, postulated by Fox (T. G. Fox, Bull. Am. Phys. Soc. (Ser.II) 1 (1956), 123), those skilled in the art are able to select suitable polymers (glass transition temperatures for homopolymers are to be found, for example, in Ullmanns Encyclopedia of Industrial Chemistry, Vol. A21, VCH, Weinheim 1992, page 169, or in J. Brandrup, E. H. Immergul, Polymer Handbook, $3^{rd}$ Ed., J. Wiley, New York 1998).

Furthermore, it is often advantageous if the novel components (A) and (B) are used together with antifoams. This prevents too much air from being introduced into the concrete in the form of air pores during the preparation of the ready-to-use building materials, which air pores would reduce the strength of the set mineral building material. Suitable antifoams comprise in particular polyalkylene oxide-based antifoams, such as polyethylene oxide, polypropylene oxide, dialkyl ethers, such as diethylene glycol heptyl ether, polyethylene oxide oleyl ether, polypropylene oxide dibutyl ether, polyethylene oxide 2-ethylhexyl ether or polypropylene oxide 2-ethylhexyl ether. Also suitable are the ethoxylation products and the propoxylation products of alcohols of 10 to 20 carbon atoms, ethoxylated/propoxylated (alkyl)phenol, such as propoxylated phenol (degree of propoxylation from 2 to 40) and ethoxylated (alkyl)phenol (degree of ethoxylation from 2 to 50). The diesters of alkylene glycols or polyalkylene glycols, such as diethylene glycol dioleate or ethylene glycol distearate, or aliphatic acid esters of alkylene oxide sorbitans, such as polyethylene oxide sorbitan monolaurate or polyethylene oxide sorbitan trioleate, are also suitable. Other suitable antifoams are phosphoric esters, such as tributyl phosphate or triisobutyl phosphate, phthalates, such as dibutyl phthalates, to siloxanes, such as polydiniethylsiloxane and its derivatives, as obtained, for example, by hydrosilylation with allyl alkoxylates. Anionic antifoams, such as the sulfuric monoesters of ethoxylated (alkyl)phenols, for example the sodium salt of methyl polypropylene oxide sulfate and the sodium salt of n-dodecylphenol ethoxylate sulfate, or phosphates of ethoxylated fatty alcohols, such as polyethylene oxide stearyl phosphate, are furthermore suitable. Such antifoams are usually used in amounts of from 0.05 to 10, preferably from 0.5 to 5, % by weight, based on the polymers.

The antifoams can be combined with the polymer in various ways. If the polymer is present, for example, in the form of an aqueous solution, the antifoam can be added in solid or dissolved form to the polymer solution. If the antifoam is insoluble in the aqueous polymer solution, emulsifiers or protective colloids may be added to stabilize it.

If the novel components (A) and (B) are present in the form of a solid, as obtained, for example, from spray-drying or fluidized-bed granulation, the antifoam can be admixed in the form of a solid or, in the case of the spray-drying process or spray granulation process, can be compounded together with the polymer.

Use as Biodegradable Polymers, for Example as Materials for Implants, Surgical Suture Materials and Garbage Bags Regarding this use of the components (A) and (B) described herein, reference may be made to EP-A 0 654 492, in particular to the section extending from page 7, line 53 to page 11, line 39.

The novel components (A) and (B), in particular when aliphatic polyesters are involved, can be used, for example, as biodegradable polymers for implants, surgical suture material and garbage bags.

For use as garbage bags, the components under discussion here are molded by a generally customary blow molding method to give such articles. If conventional packaging materials, such as packaging containers for foods, are to be produced, the novel components can also be prepared in the form of foams, conventional methods being employed in turn here.

If the novel components have fiber-forming properties, as is the case, for example, with polyesters, they can be spun into fibers, which then in turn can be used, for example, for surgical suture materials, owing to their biodegradability.

They are used in the form of individual fibers or in the form of fiber fabrics.

For fiber production, too, conventional methods are employed.

Use as Component in Water-Soluble Adhesives, for Example Wallpaper Adhesives

In this use of the components (A) and (B), reference may be made to EP-A 0 393 491 for further details. Thus, the present invention also relates to the use of the components (A) and/or (B) as redispersion polymers in free-flowing fine-particle dry powders based on a water-soluble and/or water-swellable combination of these components with nonionic cellulose ethers, if necessary as a mixture with further assistants and/or without adhesive power.

The present invention also accordingly relates to free-flowing fine-particle dry powders based on a water-soluble and/or water-swellable combination of nonionic cellulose ethers and dried redispersion polymers, if desired as a mixture with further assistants with and/or without adhesive power. According to the invention, in these free-flowing fine-particle dry powders, the particle structure of the at least predominant fraction of the particulate dry material has closed cores of the nonionic cellulose ethers which are surrounded by a shell of the redispersion polymer or firmly bonded thereto. In the respective individual particle, in particular a majority of cores of nonionic cellulose ethers can be firmly enclosed by the polymer shell, it being possible for these individual cores based on the nonionic cellulose ether also to have different particle sizes. Nonionic cellulose ethers are understood by those skilled in the art as meaning alkyl, aralkyl and hydroxyalkyl ethers or cellulose. There are simple ethers having only one substituent and mixed ethers having two or more different substituents in the cellulose chain. Thus, for example in the case of methylcellulose, the solubility and the flocculation point of the cellulose derivative can be influenced in a specific manner by an additional, slight alkoxylation by reaction with ethylene oxide and/or propylene oxide.

These free-flowing fine-particle dry powders are prepared by thorough mixing of the nonionic cellulose ethers in powder form or in the form of an aqueous powder suspension with the aqueous polymer dispersion, it being possible, if desired, also to mix in additional amounts of water.

Suitable nonionic cellulose ethers for the purposes of the invention are all compounds of this type which in their dissolution behaviour exhibit the phenomenon of flocculation at elevated temperatures, preferably at temperatures or at least about 60° C., and are thus to be characterized by the turbidity or flocculation point. If necessary. this property can be rapidly and easily determined by a laboratory experiment. Alkylcelluloses are particularly suitable here. The most important class comprises lower alkylcelluloses whose alkyl radicals have in particular 1 to 3 carbon atoms. The member of this class which is widely used in practice is methylcellulose. The degree of etherification of such nonionic cellulose ethers may be, for example, in the range of from about 1.0 to 1.3 as the lower limit and up to 2.5 to 3.0 as the upper limit, in particular in the range from 1.3 to 2.6. The cellulose ethers, preferably methylcellulose, may additionally be alkoxylated, for example ethoxylated and/or propoxylated, and degrees of alkoxylation of from about 0.05 to 1.5 may be preferred here.

Suitable polymer compounds redispersible in water are the reaction products (A) and/or polymers (B) described herein. Both homopolymers and/or copolymers of the classes of substances selected in each case are suitable here. Typical members of these polymer compounds are vinyl esters of lower carboxylic acids, vinyl acetate and/or vinyl propionate being particularly important. In addition to the is homopolymers of this type, copolymers, for example vinyl acetate/maleate copolymers or ethylene/vinyl acetate copolymers, are used in practice. A further important class comprises corresponding (meth)acrylate homo- and/or copolymers, an example of suitable copolymers being styrene acrylate.

These aqueous polymer dispersions comprising component (A) and/or (B) are now subjected to spray-drying not as such but rather—if desired after dilution with further amounts of water—after heating to a temperature level which corresponds at least to the turbidity or flocculation point of the nonionic cellulose ether or ethers to be incorporated. Temperatures which are slightly, for example from 10 to 20° C., above the respective turbidity point can preferably be employed.

If such a slurry is kept permanently at, such a temperature level, it is possible without problems to incorporate even large amounts of the nonionic alkylcellulose ethers as preformed dry powder into the liquid phase without thereby shifting the viscosity of the slurry into regions which would make the use of the spray technology impossible. Under the conditions according to the invention, there is instead a limited increase in the slurry viscosity, for example in the range which otherwise also occurs with addition of inert additives, for example with the addition of alpha-cellulose powder having a similar particle distribution or other conventional fillers.

The mixing ratios of nonionic cellulose ether to redispersion polymer, calculated in each case as a solid, may be varied within a wide range. In particular, corresponding mixing ratios of from about 5:95 to 95:5 are suitable. Preferred mixing ratios of these two main components are roughly in the range from 60:40 to 40:60, good products being obtained in the region of about identical ratios or with only a slight excess, based on weight, of the nonionic cellulose ethers.

On spraying such a slurry, a free-flowing fine-particle dry product is obtained, which virtually exclusively comprises polymer-coated nonionic alkylcellulose cores of a relatively uniform composition and particle structure. The mean particle size of the novel products, based on the initial grading curve of the cellulose ethers used, for example in the form of methylcellulose used, is substantially above the mean particle size applicable to commercial redispersion powders. It may be preferable to bring the novel free-flowing powders to mean particle diameters of from about 50 to 500 $\mu$m, preferably from about 100 to 300 $\mu$m.

Furthermore, the particles described above may undergo at least partial agglomeration, which results in agglomerates which consist of at least two, formerly independent particles which may be joined to one another with different adhesive strengths.

In contrast to physical mixtures, the spray-dried products obtained according to the invention do not give rise to any significant amounts of dust, which is to be regarded as a considerable advantage in their processing.

According to a further feature of the invention, it is possible to incorporate additional assistants with and/or without adhesive properties into the novel free-flowing fine-particle powders.

Examples of such assistants are wetting agents and preservatives, consistency-imparting substances and additional components having adhesive power, such as natural starch, swellable starch, starch ethers, dextrins, ionic cellulose ethers and/or other aqueous polymer formulations.

These assistants present in addition to the main components preferably account for a constantly minor amount compared with the main components comprising nonionic cellulose ether and redispersion polymer.

The spray-drying is effected in a manner known per se, usually in spray towers, and the slurry to be dried can be sprayed in with the aid of atomizing disks or airless or binary nozzles.

The field of use of the novel multicomponent powders covers the entire area for the use of such mixtures of substances. Examples are the use as wall covering adhesives, in particular wallpaper adhesives, and the use as an improving additive to coating materials, such as paints and varnishes, and to cement-based systems. These powders are particularly suitable as additives in filling and leveling compounds, tile adhesives and plaster-based filling compounds. Products spray-dried according to the invention constitute a raw material which permits access to hitherto unachieved application benefits in the adhesives and building chemicals sector, within wide ranges.

For further details regarding the type of the further components and the preparation of the dry powder described above, reference may be made to EP-A 0 393 491.

Use as Adhesive for Floor Coverings

The present invention furthermore relates to the use of components (A) and (B) in the form of aqueous adhesive compositions, in particular as adhesives for floor coverings. For this purpose, the components (A) and/or (B) are mixed with polyurethane latices in a manner known per se, if required an inert filler, a plasticizer and a crosslinking agent also being part of the composition. The amount of the components (A) and/or (B) varies within a range from 1 to 20% by weight. Further details regarding this application are given in U.S. Pat. No. 5,455,293, whose disclosure in this context is hereby fully incorporated in the context of the present application.

Use as Thickener of Aqueous or Predominantly Aqueous Systems

The novel components (A) and (B) are suitable for thickening aqueous or predominantly aqueous systems, such as surface coatings, print pastes and pigment pastes, filler and pigment dispersions, textiles, leather and paper assistants, formulations for mineral oil production, formulations of detergents, adhesives, waxes for polishes, formulations for pharmaceutical and veterinary purposes, crop protection formulations, cosmetic articles, etc. Water itself can also be thickened with the novel components (A) and (B) in order subsequently, if required, to add further additives to said water or to add said water itself to aqueous formulations. The novel thickeners can be used in mixtures with other thickeners, for example those based on polyacrylates, cellulose derivatives or inorganic thickeners.

Examples of aqueous systems which can be thickened according to the invention are aqueous polyacrylate dispersions, aqueous dispersions of copolymers of olefinically unsaturated monomers, aqueous polyvinyl acetate dispersions, aqueous polyurethane dispersions, aqueous polyester dispersions and in particular ready-to-use formulations of the type discussed above and based on such dispersions.

The novel components (A) and (B) can of course be used as such, preferably in the form of granules or, if required, powders. However, liquid formulations which, in addition to the novel polyurethanes, contain water, solvents, such as butyldiglycol, isopropanol, methoxypropyl acetate, ethylene glycol and/or propylene glycol, nonionic emulsifiers, surfactants and/or, if required, further additives are preferably used since this substantially facilitates the incorporation of the novel thickeners into aqueous or predominantly aqueous systems.

The ready-to-use formulations of the novel components (A) and (B) are particularly preferably aqueous solutions or dispersions having a solids content of from 10 to 80, preferably from 30 to 60, particularly preferably from 40 to 50, % by weight.

The amount of the novel components (A) and (B) which are added to the aqueous or predominantly aqueous systems for achieving the desired thickening depends on the respective intended use and can be determined by those skilled in the art in a few experiments. As a rule, from 0.05 to 10, preferably from 0.1 to 4, particularly preferably from 0.1 to 1, % by weight of the novel components (A) and (B) are used, these percentages being based on the solids content of the components (A) and (B) on the one hand and on the solids content of the aqueous system to be thickened, on the other hand.

Use as Component in Pressure-Sensitive Adhesive Materials

The components (A) and (B) described herein can also be used as components in pressure-sensitive adhesive materials. Such components (A) and/or (B) based on block copolymers containing polymer blocks formed from vinylaromatics (A blocks), preferably styrene, and those formed by polymerization of 1,3-dienes (D blocks), preferably butadiene and isoprene, are preferably employed.

According to the invention, both homopolymer and copolymer blocks can be used. The resulting block copolymers may contain identical or different D blocks, some or all of which can be completely hydrogenated or which can be selectively hydrogenated. Block copolymers may have a linear A-D-A structure. Block copolymers having a radial structure and star and linear multiblock copolymers may also be used. A-D two-block copolymers may be present as further components. Block copolymers may be modified, for example functionalized by reaction with maleic anhydride. According to the invention, block copolymers of vinylaromatics and isobutylene can also be used. All of the above-mentioned polymers can be used alone or in mixture with one another. Typical concentrations in which the styrene block copolymers are used are from 15 to 75, preferably from 30 to 60, particularly preferably from 35 to 55, % by weight.

Suitable tackifiers include: colophony and its derivatives, aliphatic, aromatically modified aliphatic, aromatic and phenol-modified adhesive resins, to mention but a few. The concentrations in which the resins are used are typically from 15 to 75, preferably from 30 to 65, particularly preferably from 35 to 60, % by weight. Where colophony and its derivatives are used, esters of partially and completely hydrogenated colophony are preferably employed.

Homopolymers and copolymers of vinylaromatics, for example styrene or α-methylstyrene, polyphenylene oxides and also phenylene oxide-modified resins may be used as resins compatible with the terminal blocks, chiefly resins compatible with the vinylaromatic blocks.

Further optimum components of the mixture comprise plasticizer oils and liquid resins (concentration of use from 0 to not more than about 35% by weight), fillers (reinforcing and nonreinforcing), for example silica, in particular synthetic silica, glass (milled or in the form of beads), aluminas, zinc oxides, calcium carbonates, titanium dioxide, carbon blacks, to mention but a few, and antiaging compositions (primary and secondary antioxidants, light stabilizers, antiozonants, metal deactivators, etc.). Components of the mixture also comprise polymers which in particular affect the ozone resistance of the block copolymers, for example polyvinyl acetates and ethylene/vinyl acetate copolymers.

Further polymers which may be used are natural and synthetic polymers, for example natural rubber, synthetic polyisoprenes, polybutadienes, polychloroprenes. SBR, Kraton Liquid (Shell Chemicals), low molecular weight styrene/diene block copolymers, for example Kraton LVSI 101, polyisobutylene, etc., which may replace up to about 50% by weight of the vinylaromatic-containing block copolymers.

Novel pressure-sensitive adhesive materials may have been chemically crosslinked, in particular radiation-crosslinked (for example by UV irradiation, γ-irradiation or irradiation by means of fast electrons).

Novel adhesive materials are optionally those whose tack is produced only as a result of thermal activation.

Suitable pressure-sensitive adhesive materials in addition to those described above and based on vinylaromatic-containing block copolymers are all those which have tensile strength and cohesion sufficient for the release process. Corresponding pressure-sensitive adhesive materials can be used alone or in combination with those based on vinylaromatic-containing block copolymers. For example, tacky acrylate copolymers copolymerized with macromonomers are suitable according to the invention, the macromonomers having a glass transition temperature of >+40° C. The high tensile strength of corresponding copolymers is probably achieved by the association of the macromonomers. Suitable macromonomers are, for example, methacryloyl-terminated polymethyl methacrylates, The pressure-sensitive adhesive materials described above can be used for self-adhesive tapes for tamper-proof applications, the fixing of posters, pictures, calendars, postcards, information signs, self-adhesive hooks and labels, for example price labels, and for the adhesive bonding of foam.

Regarding this use, reference may be made to DE-A 196 49 728, whose relevant content on pages 3 and 4 is hereby fully incorporated by reference in the context of the present application.

Use as Solid or Liquid Adhesive

According to the present inventor, the components (A) and (B) can also be used in solid adhesives in order to impart to them the adhesion which they produce. Particularly used components (A) and (B) are those which may be selected from the group consisting of polyvinyl acetate homopolymers, polyvinyl acetate copolymers, partially or completely hydrolyzed polyvinyl alcohol, polyvinyl butyral, polyvinylpyrrolidone, polyacrylic acid salts, polymethacrylic acid salts, polyacrylate, polymethacrylate, various gums, polysaccharides and rubber. The components (A) and/or (B) may be a mixture of more than one of these chemicals. Preferably, the components (A) and/or (B) are a mixture of polyvinyl alcohol and polyvinylpyrrolidone. It has been found that at least about 15%, preferably at least 20%, of the components (A) and/or (B) in the solid adhesive result in good adhesion by the solid adhesive. Too large an amount of the components (A) and/or (B) cannot be dissolved in water. The components (A) and/or (B) are therefore preferably limited to from about 15 to 42%, better still from about 20 to 36%, in the solid adhesive.

Benzylidenesorbitol is present in this solid adhesive in order to serve as a gelatinizing composition or gel former. Chemicals which may be used as benzylidenesorbitol are those which are used as a benzylidenesorbitol in the references. Among these chemicals, dibenzylidene (penta- or hexahydro-)saccharide is preferred, dibenzylidenesorbitol being particularly preferred. At least about 0.3%, better still at least 0.8%, of benzylidenesorbitol should be present in the solid adhesive in order to ensure appropriate strength properties of a stick-like product produced from this solid adhesive. Too much benzylidenesorbitol cannot be dissolved in organic solvents. The benzylidenesorbitol in the solid adhesive is therefore preferably limited to from about 0.3 to 6%, better still from about 0.8 to 4%.

At least about 25%, better still at least about 28%, of water is present in the solid adhesive in order to facilitate the dissolution of the benzylidenesorbitol. Too much water in the solid adhesive presents dissolution of the benzylidenesorbitol and adversely affects the adhesion of the solid adhesive. Accordingly, the amount of water is limited to from about 25 to 60%, preferably from about 28 to 57%, in the solid adhesive.

Since this solid adhesive contains a large amount of water, it is possible for various microorganisms to multiply in the solid adhesive during prolonged storage and release. The growth of various microorganisms adversely affects the properties of the solid adhesive. To prevent the growth of various microorganisms in the solid adhesive, the latter contains at least 0.001%, preferably 0.003%, better still at least 0.005%, of a preservative, for example an isothiazoline preservative. Too high a content of isothiazoline preservatives adversely affects the physical properties of the solid adhesive and results in higher costs of the solid adhesive. Accordingly, the isothiazoline preservatives are limited to from about 0.001 to 0.5%, preferably from about 0.003 to 0.1%, better still from about 0.005 to 0.05%, in the solid adhesive. The isothiazoline preservatives can be selected from the group consisting of 1,2-benzisothiazolin-3-one, methylisothiazoline, octylisothiazoline and isothiazolinone. Isothiazoline preservatives may be a mixture of more than one of these chemicals. Among these chemicals, 1,2-benzisothiazolin-3-one is preferred.

At least about 12% and preferably at least 13% of organic solvent is present in the solid adhesive in order to facilitate the dissolution of benzylidenesorbitol. Too high a content of solvent adversely affects the adhesive and strength properties of a stick-like product produced from solid adhesive. Accordingly, the organic solvents are preferably limited to from about 12 to 50%, better still from about 13 to 43%. Suitable organic solvents are water-miscible organic solvents, preferably polar organic solvents. The organic solvents can be selected in particular from the group consisting of various alcohols, glycol alkyl ethers, alkyl ethers and pyrrolidone derivatives. In particular, the organic solvent can be selected from the group consisting of 3-methoxy-3-methyl-1-butanol, N-methyl-2-pyrrolidone, 2-butoxyethanol, isopropyl alcohol, 1-ethoxy-2-propanol, 1-methoxy-2-propanol and 2-ethoxyethanol. The organic solvent may be a mixture of more than one of these chemicals. Among these, glycol (of 2 to 6 carbon atoms) alkyl (of 1 to 3 carbon atoms) monoether is particularly preferred.

Further chemicals may be present in this solid adhesive. For example, from 0.1 to 1%, preferably from about 0.3 to 0.7%, of antirust compositions may be present in the solid adhesive on shaping of said adhesive and when said adhesive is shaped into a stick-like product, in order to prevent the formation of rust on metallic parts. Preferably, benzotriazole corrosion inhibitor is present in the solid adhesive. In addition, fragrances and/or pigments may be present in the solid adhesive.

Solid adhesives in the context of the present text are all types of adhesives which are present in the solid state at ambient temperature, for example at room temperature. These include in particular hotmelt adhesives, hotmelt pressure-sensitive adhesives and pressure-sensitive adhesives. Said adhesives can also be applied, for example, to substrate materials, for example to tape-like substrate materials, as used in the production of adhesive tapes.

Regarding further details, reference may be made to DE-A 197 55 683.

Use for Producing Self-Cleaning Surfaces of Articles (Lotus Effect)

The novel components (A) and (B), in particular the novel block copolymers, are extremely useful for producing self-cleaning surfaces of articles, as described, for example, in WO 96/04123, the relevant content of which is hereby fully incorporated by reference in the context of the present application. Particularly advantageous block copolymers are those which, owing to the incompatibility of their respective blocks form self-cleaning (i.e. hydrophobic and correspondingly structured) surfaces by self-organization after application.

Use as Stain Inhibitors in Solid and Liquid Formulations

The novel components (A) and (B) can also be used as stain inhibitors in solid and liquid formulations. In this application, they are used in particular in detergents.

In this respect, reference may be made to the publication in Research Disclosure of August 1998, page 1047 et seq., the relevant content of which is hereby fully incorporated by reference in the context of the present application.

We claim:

1. Coating materials comprising a reaction product (A) which is prepared by means of a process comprising the following stage (i):

(i) Reaction, under free radical conditions, of a reaction mixture comprising at least one monomer (a), capable of free radical reaction, in the presence of at least one radical of the formula (III)

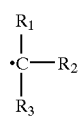

(III)

where $R_1$ to $R_3$, in each case independently of one another, are hydrogen, methyl or a radical-stabilizing and/or bulky group selected from the group consisting of unsubstituted and substituted, linear and branched alkyl groups having two or more carbon atoms, cycloalkyl, alcohol, ether, polyether, amine and aralkyl radicals, substituted and unsubstituted aromatic, heterocyclic and olefinic hydrocarbons, halogen atoms, substituted and unsubstituted, linear and branched alkenyl and alkynyl groups, —C(O)$R_5$, —C(O)O$R_5$, —C$R_5R_6$—O—$R_7$, —O—C(O)$R_5$, —CN, —O—CN, —S—CN, —O—C=N$R_5$, —S—C=N$R_5$, —O—C$R_5R_6$—C$R_7R_8$N$R_9R_{10}$, —N=C=O, —C=N$R_5$, —C$R_5R_6$-Hal, —C(S)$R_5$, —C$R_5R_6$—P(O)$R_7R_8$, —C$R_5R_6$—P$R_7R_8$, —C$R_5R_6$—N$R_7R_8$, —C$R_5R_6$(O$R_7$)(O$R_8$), —C$R_5R_6$(O$R_7$)(N$R_8$), —C$R_5R_6$(N$R_7$)(N$R_8$), anhydride, acetal and ketal groups, —SO$_2R_5$, amidine groups, —N$R_5$C(S)N$R_6$, —N$R_5$C(S)—O$R_6$, —N=C=S, —NO$_2$, —C=N—OH, —N($R_5$)=N$R_6$, —P$R_5R_6R_7$, —OSi$R_5R_6R_7$ and —Si$R_5R_6R_7$, where $R_5$ to $R_{10}$, independently of one another in each case, are defined in the same way as $R_1$ to $R_4$, or two of the radicals $R_1$ to $R_4$ form a $C_4$- to $C_7$-ring which in turn may be substituted or unsubstituted and, optionally, contain one or more heteroatom, with the proviso that at least two of the radicals $R_1$ to $R_3$ are a radical-stabilizing and/or bulky group as defined above, or a polymer (B) which is prepared by a process comprising the stage (ii):

(ii) Reaction of the reaction product (A) obtained in stage (i), under free radical conditions, in the presence of at least one monomer (b) capable of free radical hoinopolymerization or copolymerization, and suitable additives (C) selected from the group consisting of crosslinking agents, crosslinking catalysts, initiators, pigments, dyes, fillers, reinforcing fillers, rheology assistants, wetting agents, dispersants, antifoams, adhesion promoters, additives for improving substrate wetting, additives for improving surface smoothness, dulling agents, leveling agents, film-forming assistants, drying agents, antiskinning agents, light stabilizers, corrosion inhibitors, biocides, flameproofing agents, polymerization inhibitors, photoinhibitors and plasticizers.

2. Coating materials as claimed in claim 1, wherein the radical of the formula (III) is derived from at least one compound of the formula (I)

(I)

where $R_1$ to $R_4$, in each case independently of one another, are hydrogen, methyl or a radical-stabilizing and/or bulky group selected from the group consisting of unsubstituted and substituted, linear and branched alkyl group having two or more carbon atoms, cycloalkyl, alcohol, ether, polyether, amine and aralkyl radicals, substituted and unsubstituted aromatic, heterocyclic and olefinic hydrocarbons, halogen atoms, substituted and unsubstituted, linear and branched alkenyl and alkynyl groups, —C(O)$R_5$, —C(O)O$R_5$, —C$R_5R_6$—O—$R_7$, —O—C(O)$R_5$, —CN, —O—CN, —S—CN, —O—C=N$R_5$, —S—C=N$R_5$, —O—C$R_5R_6$—C$R_7R_8$N$R_9R_{10}$, —N=C=O, —C=N$R_5$, —C$R_5R_6$-Hal, —C(S)$R_5$, —C$R_5R_6$—P(O)$R_7R_8$, —C$R_5R_6$—P$R_7R_8$, —C$R_5R_6$—N$R_7R_8$, —C$R_5R_6$(O$R_7$)(O$R_8$), —C$R_5R_6$(O$R_7$)(N$R_8$), —C$R_5R_6$(N$R_7$)(N$R_8$), anhydride, acetal and ketal groups, —SO$_2R_5$, amidine groups, —N$R_5$C(S)N$R_6$, —N$R_5$C(S)—O$R_6$, —N=C=S, —NO$_2$, —C=N—OH, —N($R_5$)=N$R_6$, —P$R_5R_6R_7$, —OSi$R_5R_6R_7$ and —Si$R_5R_6R_7$, where $R_5$ to $R_{10}$, independently of one another in each case, are defined in the same way as $R_1$ to $R_5$, or two of the radicals $R_1$ to $R_4$ form a $C_4$- to $C_7$-ring which in turn may be substituted or unsubstituted and may contain one or more heteroatoms, with the proviso that at least two of the radicals $R_1$ to $R_4$ are a radical-stabilizing and/or bulky group, as defined above, or the compounds are diphenylethylene, dinaphthylethylene, 4,4'-vinylidenebis(N,N'-dimethylaniline) 4,4'-vinylidenebis(aminobenzene) or cis- and trans-stilbene.

3. Coating materials as claimed in claim 1, wherein the radical of the formula (III) is derived from at least one compound of the formula (II):

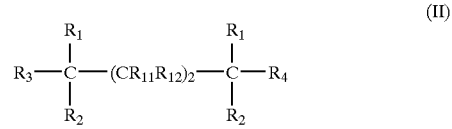

(II)

where $R_1$ to $R_4$ and $R_{11}$ and $R_{12}$, in each case independently of one another, are hydrogen, methyl or a radical-stabilizing and/or bulky group selected from the group consisting of unsubstituted and substituted, linear and branched alkyl groups having two or more carbon atoms, cycloalkyl, alcohol, ether, polyether, amine and aralkyl radicals, substituted and unsubstituted aromatic, heterocyclic and olefinic hydrocarbons, halogen atoms, substituted and unsubstituted, linear and branched alkenyl and alkynyl group, —C(O)$R_5$, —C(O)O$R_5$, —C$R_5R_6$—O—$R_7$, —O—C(O)$R_5$, —CN, —O—CN, —S—CN, —O—C=N$R_5$, —S—C=NR$_5$, —O—CR$_5$R$_6$—CR$_7$R$_8$NR$_9$R$_{10}$, —N=C=O, —C=NR$_5$, —CR$_5$R$_6$-Hal, —C(S)R$_5$, —CR$_5$R$_6$—P(O)R$_7$R$_8$, —CR$_5$R$_6$—PR$_7$R$_8$, —CR$_5$R$_6$—NR$_7$R$_8$, —CR$_5$R$_6$(OR$_7$)(OR$_8$), —CR$_5$R$_6$(OR$_7$)(NR$_8$), —CR$_5$R$_6$(NR$_7$)(NR$_8$), anhydride, acetal and ketal groups, —SO$_2$R$_5$, amidine groups, —NR$_5$C(S)NR$_6$, —NR$_5$C(S)—OR$_6$, —N=C=S, —NO$_2$, —C=N—OH, —N(R$_5$)=NR$_6$, —PR$_5$R$_6$R$_7$, —OSiR$_5$R$_6$R$_7$ and —SiR$_5$R$_6$R$_7$, where R$_5$ to R$_{10}$, independently of one another in each case, are defined in the same way as R$_1$ to R$_4$, or two of the radicals R$_1$ to R$_4$ form a C$_4$- to C$_7$-ring which in turn may be substituted or unsubstituted and, optionally, contain one or more heteroatoms, with the proviso that at least two of the radicals R$_1$ to R$_4$ are a radical-stabilizing and/or bulky group, as defined above.

4. Coating materials as claimed in claim 1, the radical of the formula (III) comprising the following combinations as radical-stabilizing and/or bulky groups:

at least one substituted or unsubstituted phenyl and —C(O)R$_5$;

at least one substituted or unsubstituted phenyl and —CN;

at least one substituted or unsubstituted phenyl and —C(O)OR$_5$;

independently of one another, at least two substituted or unsubstituted phenyl groups;

independently of one another, at least two —C(O)R$_5$; and independently of one another, at least two —CN.

5. Coating materials as claimed in claim 1, the radical (III) being derived from the following compounds of the formula (I) or (II) or mixtures of two or more thereof:

1,1,4,4-tetraphenyl-1,3-butadiene
1,4-bis(2-methylstyryl)benzene
1,2,3,4,5-pentaphenyl-1,3-cyclopentadiene
1,2,3,4-tetraphenyl-1,3-cyclopentadiene
acenaphthylene
cis- and trans-alpha-methylstilbene
cis- and trans-4,4'-diphenylstilbene, diphenylethylene, dinaphthylethylene, 4,4'-vinylidenebis(N,N'-dimethylaniline), 4,4'-vinylidenebis(aminobenzene), cis- and trans-stilbene,
trans-trans- and trans-cis- and cis-cis-1,4-diphenyl-1,3-butadiene
alpha,omega-tetraphenylpolyethyne
diphenylfulvene
triphenylethene
tetraphenylethene
1-cyano-1-phenylethylene; 1-alkoxycarbonyl-1-phenylethylene; 1,1-dialkoxycarbonyl-2-ethylethylene; 1,1-dialkoxycarbonyl-2-phenylethylene, 1,1-dialkoxycarbonyl-2,2-dimethylethylene; 1,1-dialkoxycarbonylmethylethylene;
9-methylenexanthene; 9-methylenethioxanthene, 9-methylene-10-H-acridine, diphenylethylene, dinaphthylethylene, 4,4'-vinylidenebis(N,N'-dimethylaniline), 4,4-vinylidenebis(aminobenzene), cis- and trans-stilbene, 1,2-bis(trimethylsilyloxy)tetraphenylethane (TPSE), diethyl-2,3-dicyano-2,3-di(p-tolyl)succinate, hexaphenylethane, compounds of the structure (Ph$_2$CR$_1$—CR$_1$(Ph)$_2$, where Ph is substituted or unsubstituted phenyl and R$_1$ is selected from the group consisting of: hydrogen, ethyl, —C$_2$H$_4$—, —OC$_6$H$_5$, OSi(CH$_3$)$_3$, —OH, —OC(O)CH$_3$, —OCH$_3$, —CH$_3$, —CO$_2$C$_2$H$_5$, —CN; —OC(O)CH=CH$_2$, 1,1,2,2-tetraphenyl-1,2-diphenoxyethane (TPPA); 1,1,2,2-tetraphenyl-1,2-bis(trimethylsilyloxy)ethane (TPSA) and 1,2,2,2-tetraphenyl-1,2-dicyanoethane (TPCA); 1,2-diphenyl-1,2-dicyano-1,2-dimethylethane.

6. Coating materials as claimed in claim 1, which are prepared in the presence of a low molecular weight base selected the group consisting of NaOH, KOH, ammonia, diethanolamine, triethanolamine, mono-, di- and triethylamine, dimethylethanolamine and a mixture of two or more thereof.

7. Resin materials comprising a reaction product (A) which is prepared by means of a process comprising the following stage (i):

(i) Reaction, under free radical conditions, of a reaction mixture comprising at least one monomer (a), capable of free radical reaction, in the presence of at least one radical of the formula (III)

(III)

where R$_1$ to R$_3$, in each case independently of one another, are hydrogen, methyl or a radical-stabilizing and/or bulky group selected from the group consisting of unsubstituted and substituted, linear and branched alkyl groups having two or more carbon atoms, cycloalkyl, alcohol, ether, polyether, amine and aralkyl radicals, substituted and unsubstituted aromatic, heterocyclic and olefinic hydrocarbons, halogen atoms, a substituted and unsubstituted, linear and branched alkenyl and alkynyl groups, —C(O)R$_5$, —C(O)OR$_5$, —CR$_5$R$_6$—O—R$_7$, —O—C(O)R$_5$, —CN, —O—CN, —S—CN, —O—C=NR$_5$, —S—C=NR$_5$, —O—CR$_5$R$_6$—CR$_7$R$_8$NR$_9$R$_{10}$, —N=C=O, —C=NR$_5$, —CR$_5$R$_6$-Hal, —C(S)R$_5$, —CR$_5$R$_6$—P(O)R$_7$R$_8$, —CR$_5$R$_6$—PR$_7$R$_8$, —CR$_5$R$_6$—NR$_7$R$_8$, —CR$_5$R$_6$(OR$_7$)(OR$_8$), —CR$_5$R$_6$(OR$_7$)(NR$_8$), —CR$_5$R$_6$(NR$_7$)(NR$_8$), anhydride, acetal and ketal groups, —SO$_2$R$_5$, amidine groups, —NR$_5$C(S)NR$_6$, —NR$_5$C(S)—OR$_6$, —N=C=S, —NO$_2$, —C=N—OH, —N(R$_5$)=NR$_6$, —PR$_5$R$_6$R$_7$, —OSiR$_5$R$_6$R$_7$ and —SiR$_5$R$_6$R$_7$, where R$_5$ to R$_{10}$, independently of one another in each case, are defined in the same way as R$_1$ to R$_4$, or two of the radicals R$_1$ to R$_4$ form a C$_4$- to C$_7$-ring which in turn may be substituted or unsubstituted and, optionally, contain one or more heteroatom, with the proviso that at least two of the radicals R$_1$ to R$_3$ are a radical-stabilizing and/or bulky group as defined above, or a polymer (B) which is prepared by a process comprising the stage (ii):

(ii) Reaction of the reaction product (A) obtained in stage (i), under free radical conditions, in the presence of at least one monomer (b) capable of free radical homopolymerization or copolymerization, and additives selected from the group consisting of lubricants, antistatic agents, antioxidants, heat stabilizers, ultraviolet absorbers, pigments, dyes, nucleating agents, rubbers, fillers, dulling agents, brightening compositions, flameproofing agents, blowing agents, mold release agents and mineral oil.

8. Resin materials as claimed in claim 7, wherein the radical of the formula (III) is derived from at least one compound of the formula (I):

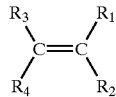

where $R_1$ to $R_4$ and $R_{11}$ and $R_{12}$, in each case independently of one another, are hydrogen, methyl or a radical-stabilizing and/or bulky group selected from the group consisting of unsubstituted and substituted, linear and branched alkyl groups having two or more carbon atoms, cycloalkyl, alcohol, ether, polyether, amine and aralkyl radicals, substituted and unsubstituted aromatic, heterocyclic and olefinic hydrocarbons, halogen atoms, substituted and unsubstituted, linear and branched alkenyl and alkynyl groups, —C(O)$R_5$, —C(O)O$R_5$, —C$R_5R_6$—O—$R_7$, —O—C(O)$R_5$, —CN, —O—CN, —S—CN, —O—C=N$R_5$, —S—C=N$R_5$, —O—C$R_5R_6$—C$R_7R_8$N$R_9R_{10}$, —N=C=O, —C=N$R_5$, —C$R_5R_6$-Hal, —C(S)$R_5$, —C$R_5R_6$—P(O)$R_7R_8$, —C$R_5R_6$—P$R_7R_8$, —C$R_5R_6$—N$R_7R_8$, —C$R_5R_6$(O$R_7$)(O$R_8$), —C$R_5R_6$(O$R_7$)(N$R_8$), —C$R_5R_6$(N$R_7$)(N$R_8$), anhydride, acetal and ketal groups, —SO$_2R_5$, amidine groups, —N$R_5$C(S)N$R_6$, —N$R_5$C(S)—O$R_6$, —N=C=S, —NO$_2$, —C=N—OH, —N($R_5$)=N$R_6$, —P$R_5R_6R_7$, —OSi$R_5R_6R_7$ and —Si$R_5R_6R_7$, where $R_5$ to $R_{10}$, independently of one another in each case, are defined in the same way as $R_1$ to $R_4$, or two of the radicals $R_1$ to $R_4$ form a $C_4$- to $C_7$-ring which in turn may be substituted or unsubstituted and, optionally, contain one or more heteroatoms, with the proviso that at least two of the radicals $R_1$ to $R_4$ are a radical-stabilizing and/or bulky group, as defined above, or the compounds are diphenylethylene, dinaphthylethylene, 4,4'-vinylidenebis(N,N'-dimethylaniline), 4,4'-vinylidenebis(aminobenzene) or cis- and trans-stilbene.

9. The resin material as claimed in claim 7, wherein the radical of the formula (III) is derived from at least one compound of the formula (II):

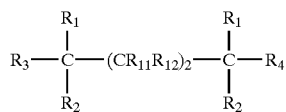

where $R_1$ to $R_4$ and $R_{11}$ and $R_{12}$, in each case independently of one another, are hydrogen, methyl or a radical-stabilizing and/or bulky group selected from unsubstituted and substituted, linear and branched alkyl groups two or more carbon atoms, cycloalkyl, alcohol, ether, polyether, and amine aralkyl radicals, substituted and unsubstituted aromatic, heterocyclic and olefinic hydrocarbons, halogen atoms, substituted and unsubstituted, linear and branched alkenyl and alkynyl groups, —C(O)$R_5$, —C(O)O$R_5$, —C$R_5R_6$—O—$R_7$, —O—C(O)$R_5$, —CN, —O—CN, —S—CN, —O—C=N$R_5$, —S—C=N$R_5$, —O—C$R_5R_6$—C$R_7R_8$N$R_9R_{10}$, —N=C=O, —C=N$R_5$, —C$R_5R_6$-Hal, —C(S)$R_5$, —C$R_5R_6$—P(O)$R_7R_8$, —C$R_5R_6$—P$R_7R_8$, —C$R_5R_6$—N$R_7R_8$, —C$R_5R_6$(O$R_7$)(O$R_8$), —C$R_5R_6$(O$R_7$)(N$R_8$), —C$R_5R_6$(N$R_7$)(N$R_8$), anhydride, acetal and ketal groups, —SO$_2R_5$, amidine groups, —N$R_5$C(S)N$R_6$, —N$R_5$C(S)—O$R_6$, —N=C=S, —NO$_2$, —C=N—OH, —N($R_5$)=N$R_6$, —P$R_5R_6R_7$, —OSi$R_5R_6R_7$ and —Si$R_5R_6R_7$, where $R_5$ to $R_{10}$, independently of one another in each case, are defined in the same way as $R_1$ to $R_4$, or two of the radicals $R_1$ to $R_4$ form a $C_4$- to $C_7$-ring which in turn may be substituted or unsubstituted and, optionally, contain one or more heteroatoms, with the proviso that at least two of the radicals $R_1$ to $R_4$ are a radical-stabilizing and/or bulky group, as defined above.

10. The resin material as claimed in claim 7, the radical of the formula (III) comprising the following combinations as radical-stabilizing and/or bulky groups:

at least one substituted or unsubstituted phenyl and —C(O)$R_5$;

at least one substituted or unsubstituted phenyl and —CN;

at least one substituted or unsubstituted phenyl and —C(O)O$R_5$;

independently of one another, at least two substituted or unsubstituted phenyl groups;

independently of one another, at least two —C(O)$R_5$; and independently of one another, at least two —CN.

11. The resin material as claimed in claim 7, the radical (III) being derived from the following compounds of the formula (I) or (II) or mixtures of two or more thereof:

1,1,4,4-tetraphenyl-1,3-butadiene
1,4-bis(2-methylstyryl)benzene
1,2,3,4,5-pentaphenyl-1,3-cyclopentadiene
1,2,3,4-tetraphenyl-1,3-cyclopentadiene
acenaphthylene
cis- and trans-alpha-methylstilbene
cis- and trans-4,4'-diphenylstilbene, diphenylethylene, dinaphthylethylene, 4,4'-vinylidenebis(N,N'-dimethylaniline), 4,4'-vinylidenebis(aminobenzene), cis- and trans-stilbene,
trans-trans- and trans-cis- and cis-cis-1,4-diphenyl-1,3-butadiene
alpha,omega-tetraphenylpolyethyne
diphenylfulvene
triphenylethene
tetraphenylethene
1-cyano-1-phenylethylene; 1-alkoxycarbonyl-1-phenylethylene; 1,1-dialkoxycarbonyl-2-ethylethylene; 1,1-dialkoxycarbonyl-2-phenylethylene, 1,1-dialkoxycarbonyl-2,2-dimethylethylene; 1,1-dialkoxycarbonylmethylethylene;
9-methylenexanthene; 9-methylenethioxanthene, 9-methylene-10-H-acridine, diphenylethylene, dinaphthylethylene, 4,4'-vinylidenebis(N,N'-dimethylaniline), 4,4'-vinylidenebis(aminobenzene), cis- and trans-stilbene, 1,2-bis(trimethylsilyloxy)tetraphenylethane (TPSE), diethyl-2,3-dicyano-2,3-di(p-tolyl)succinate, hexaphenylethane, compounds of the structure (Ph$_2$C$R_1$—C$R_1$(Ph)$_2$, where Ph is substituted or unsubstituted phenyl and $R_1$ is selected from the group consisting of: hydrogen, ethyl, —C$_2$H$_4$—, —OC$_6$H$_5$, OSi(CH$_3$)$_3$, —OH, —OC(O)CH$_3$, —OCH$_3$, —CH$_3$, —CO$_2$C$_2$H$_5$, —CN; —OC(O)CH=CH$_2$, 1,1,2,2-tetraphenyl-1,2-diphenoxyethane (TPPA); 1,1,2,2-tetraphenyl-1,2-bis(trimethylsilyloxy)ethane (TPSA) and 1,2,2,2-tetraphenyl-1,2-dicyanoethane (TPCA); 1,2-diphenyl-1,2-dicyano-1,2-dimethylethane.

12. The resin material as claimed in claim 7, which is prepared in the presence low molecular weight base selected from the group consisting of NaOH, KOH, ammonia, diethanolamine, triethanolamine, mono-, di- or triethylamine, dimethylethanolamine or a mixture of two or more thereof.

13. Aqueous dispersion containing a reaction product (A) which is prepared by means of a process comprising the following stage (i):

(i) Reaction, under free radical conditions, of a reaction mixture comprising at least one monomer (a), capable of free radical reaction, in the presence of at least one radical of the formula (III)

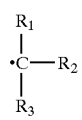
(III)

where $R_1$ to $R_3$, in each case independently of one another, are hydrogen, methyl or a radical-stabilizing and/or bulky group selected from the group consisting of unsubstituted and substituted, linear and branched alkyl groups having two or more carbon atoms, cycloalkyl, alcohol, ether, polyether, amine and aralkyl radicals, substituted and unsubstituted aromatic, heterocyclic and olefinic hydrocarbons, a halogen atoms, substituted and unsubstituted, linear and branched alkenyl and alkynyl groups, —C(O)$R_5$, —C(O)O$R_5$, —C$R_5R_6$—O—$R_7$, —O—C(O)$R_5$, —CN, —O—CN, —S—CN, —O—C=N$R_5$, —S—C=N$R_5$, —O—C$R_5R_6$—C$R_7R_8$N$R_9R_{10}$, —N=C=O, —C=N$R_5$, —C$R_5R_6$-Hal, —C(S)$R_5$, —C$R_5R_6$—P(O)$R_7R_8$, —C$R_5R_6$—P$R_7R_8$, —C$R_5R_6$—N$R_7R_8$, —C$R_5R_6$(O$R_7$)(O$R_8$), —C$R_5R_6$(O$R_7$)(N$R_8$), —C$R_5R_6$(N$R_7$)(N$R_8$), anhydride, acetal and ketal groups, —SO$_2R_5$, amidine groups, —N$R_5$C(S)N$R_6$, —N$R_5$C(S)—O$R_6$, —N=C=S, —NO$_2$, —C=N—OH, —N($R_5$)=N$R_6$, —P$R_5R_6R_7$, —OSi$R_5R_6R_7$ and —Si$R_5R_6R_7$, where $R_5$ to $R_{10}$, independently of one another in each case, are defined in the same way as $R_1$ to $R_4$, or two of the radicals $R_1$ to $R_4$ form a $C_4$- to $C_7$-ring which in turn may be substituted or unsubstituted and, if required, may contain one or more heteroatom, with the proviso that at least two of the radicals $R_1$ to $R_3$ are a radical-stabilizing and/or bulky group as defined above, or a polymer (B) which is prepared by a process comprising the stage (ii):

(ii) Reaction of the reaction product (A) obtained in stage (i), under free radical conditions, in the presence of at least one monomer (b) capable of free radical homopolymerization or copolymerization, or a mixture of (A) and (B).

14. The dispersion as claimed in claim 13, wherein the radical of the formula (III) is derived from at least one compound of the formula (I)

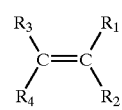
(I)

where $R_1$ to $R_4$, in each case independently of one another, are hydrogen, methyl or a radical-stabilizing and/or bulky group selected from the group consisting of unsubstituted and substituted, linear and branched alkyl groups having two or more carbon atoms, cycloalkyl, alcohol, ether, polyether, amine and aralkyl radicals, a substituted and unsubstituted aromatic, heterocyclic and olefinic hydrocarbons, a halogen atoms, a substituted and unsubstituted, linear and branched alkenyl and alkynyl groups, —C(O)$R_5$, —C(O)O$R_5$, —C$R_5R_6$—O—$R_7$, —O—C(O)$R_5$, —CN, —O—CN, —S—CN, —O—C=N$R_5$, —S—C=N$R_5$, —O—C$R_5R_6$—C$R_7R_8$N$R_9R_{10}$, —N=C=O, —C=N$R_5$, —C$R_5R_6$-Hal, —C(S)$R_5$, —C$R_5R_6$—P(O)$R_7R_8$, —C$R_5R_6$—P$R_7R_8$, —C$R_5R_6$—N$R_7R_8$, —C$R_5R_6$(O$R_7$)(O$R_8$), —C$R_5R_6$(O$R_7$)(N$R_8$), —C$R_5R_6$(N$R_7$)(N$R_8$), anhydride, acetal and ketal groups, —SO$_2R_5$, amidine groups, —N$R_5$C(S)N$R_6$, —N$R_5$C(S)—O$R_6$, —N=C=S, —NO$_2$, —C=N—OH, —N($R_5$)=N$R_6$, —P$R_5R_6R_7$, —OSi$R_5R_6R_7$ and —Si$R_5R_6R_7$, where $R_5$ to $R_{10}$, independently of one another in each case, are defined in the same way as $R_1$ to $R_4$, or two of the radicals $R_1$ to $R_4$ form a $C_4$- to $C_7$-ring which in turn may be substituted or unsubstituted and may contain one or more heteroatoms, with the proviso that at least two of the radicals $R_1$ to $R_4$ are a radical-stabilizing and/or bulky group, as defined above, or the compounds are diphenylethylene, dinaphthylethylene, 4,4'-vinylidenebis(N,N'-dimethylaniline) 4,4'-vinylidenebis(aminobenzene) or cis- and trans-stilbene.

15. The dispersion as claimed in claim 13, wherein the radical of the formula (III) is derived from at least one compound of the formula (II):

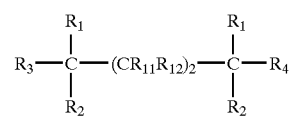
(II)

where $R_1$ to $R_4$ and $R_{11}$ and $R_{12}$, in each case independently of one another, are hydrogen, methyl or a radical-stabilizing and/or bulky group selected from the group consiting of unsubstituted and substituted, linear and branched alkyl groups having two or more carbon atoms, cycloalkyl, alcohol, ether, polyether, amine and aralkyl radicals, substituted and unsubstituted aromatic, heterocyclic and olefinic hydrocarbons, halogen atoms, substituted and unsubstituted, linear and branched alkenyl and alkynyl groups, —C(O)$R_5$, —C(O)O$R_5$, —C$R_5R_6$—O—$R_7$, —O—C(O)$R_5$, —CN, —O—CN, —S—CN, —O—C=N$R_5$, —S—C=N$R_5$, —O—C$R_5R_6$—C$R_7R_8$N$R_9R_{10}$, —N=C=O, —C=N$R_5$, —C$R_5R_6$-Hal, —C(S)$R_5$, —C$R_5R_6$—P(O)$R_7R_8$, —C$R_5R_6$—P$R_7R_8$, —C$R_5R_6$—N$R_7R_8$, —$CR_5R_6(OR_7)(OR_8)$, —$CR_5R_6(OR_7)(NR_8)$, —$CR_5R_6(NR_7)(NR_8)$, an anhydride, acetal and ketal groups, —$SO_2R_5$, an amidine groups, —$NR_5C(S)NR_6$, —$NR_5C(S)$—$OR_6$, —N═C═S, —$NO_2$, —C═N—OH, —$N(R_5)$═$NR_6$, —$PR_5R_6R_7$, —$OSiR_5R_6R_7$ and —$SiR_5R_6R_7$, where $R_5$ to $R_{10}$, independently of one another in each case, are defined in the same way as $R_1$ to $R_4$, or two of the radicals $R_1$ to $R_4$ form a $C_4$- to $C_7$-ring which in turn may be substituted or unsubstituted and, optionally, contain one or more heteroatoms, with the proviso that at least two of the radicals $R_1$ to $R_4$ are a radical-stabilizing and/or bulky group, as defined above.

16. The dispersion as claimed in claim 13, the radical of the formula (III) comprising the following combinations as radical-stabilizing and/or bulky groups:

at least one substituted or unsubstituted phenyl and —$C(O)R_5$;

at least one substituted or unsubstituted phenyl and —CN;

at least one substituted or unsubstituted phenyl and —$C(O)OR_5$;

independently of one another, at least two substituted or unsubstituted phenyl groups;

independently of one another, at least two —$C(O)R_5$; and independently of one another, at least two —CN.

17. The dispersion as claimed in claim 13, the radical (III) being derived from the following compounds of the formula (I) or (II) or mixtures of two or more thereof:

1,1,4,4-tetraphenyl-1,3-butadiene 1,4-bis(2-methylstyryl)benzene 1,2,3,4,5-pentaphenyl-1,3-cyclopentadiene 1,2,3,4-tetraphenyl-1,3-cyclopentadiene acenaphthylene cis- and trans-alpha-methylstilbene cis- and trans-4,4'-diphenylstilbene, diphenylethylene, dinaphthylethylene, 4,4'-vinylidenebis(N,N'-dimethylaniline), 4,4'-vinylidenebis(aminobenzene), cis- and trans-stilbene, trans-trans- and trans-cis- and cis-cis-1,4-diphenyl-1,3-butadiene alpha,omega-tetraphenylpolyethyne diphenylfulvene triphenylethene tetraphenylethene 1-cyano-1-phenylethylene; 1-alkoxycarbonyl-1-phenylethylene; 1,1-dialkoxycarbonyl-2-ethylethylene; 1,1-dialkoxycarbonyl-2-phenylethylene, 1,1-dialkoxycarbonyl-2,2-dimethylethylene; 1,1-dialkoxycarbonylmethylethylene;

9-methylenexanthene; 9-methylenethioxanthene, 9-methylene-10-H-acridine, diphenylethylene, dinaphthylethylene, 4,4'-vinylidenebis(N,N'-dimethylaniline), 4,4'-vinylidenebis(aminobenzene), cis- and trans-stilbene, 1,2-bis(trimethylsilyloxy)tetraphenylethane (TPSE), diethyl -2,3 -dicyano-2,3-di(p-tolyl)succinate, hexaphenylethane, compounds of the structure $(Ph_2CR_1$—$CR_1(Ph)_2$, where Ph is substituted or unsubstituted phenyl and $R_1$ is selected from the group consisting of: hydrogen, ethyl, —$C_2H_4$—, —$OC_6H_5$, $OSi(CH_3)_3$, —OH, —$OC(O)CH_3$, —$OCH_3$, —$CH_3$, —$CO_2C_2H_5$, —CN; —$OC(O)CH$═$CH_2$, 1,1,2,2-tetraphenyl-1,2-diphenoxyethane (TPPA); 1,1,2,2-tetraphenyl-1,2-bis(trimethylsilyloxy)ethane (TPSA) and 1,2,2,2-tetraphenyl-1,2-dicyanoethane (TPCA); 1,2-diphenyl-1,2-dicyano-1,2-dimethylethane.

18. The dispersion as claimed in claim 13, which is prepared in the presence of a low molecular weight base selected from the group consisting of NaOH, KOH, ammonia, diethanolamine, triethanolamine, mono-, di- and triethylamine, dimethylethanolamine and a mixture of two or more thereof.

19. A method of applying a coating material comprising a reaction product (A) or a mixture of two or more thereof or a polymer (B) as claimed in claim 1, comprising the step of dipping, spraying, knife coating, brushing, roller coating, or pouring in the form of a liquid curtain the coating material onto a substrate selected from the group consisting of films, sheets, fibers, metal sheets, woven fabrics, shaped articles of metal, glass, wood, paper, plastics, leather, mineral substrates, and composite materials thereof.

20. A method for preparing a resin material comprising a reaction product (A) or a polymer (B) as claimed in claim 7, comprising the step of mixing, optionally subsequent roll-milling and kneading (plasticization) and, optionally, subsequent granulation the reaction product (A) or the polymer (B) with additives and optionally further polymers.

21. A method for preparing a pigment formulation comprising a reaction product (A) or a polymer (B) as claimed in claim 13 as a dispersant comprising the step of mixing a pigment together with one or more dispersant(s) in the presence of water and predispersing in a suitable apparatus, wherein a mixture is obtained, subsequently milling the mixture obtained in a mill in order to establish the desired pigment particle size distribution, adding further assistants, and finally preparing the final formulation by adding corresponding amounts of water, optionally one or more humectants, and optionally further assistants, mixing and then fixing by means of a filtration apparatus with fines removal in the range from 10 to 1 $\mu$m.

22. A method for preparing finishes coating materials, toners, cosmetics, resin material, retention aids for papermaking, solubilizers in pharmaceutical and cosmetic formulations, incrustation inhibitors and/or soil-release polymers in detergents, filtration assistants and for protecting and clarifying beverages, disinfectants, elastomeric binders in printing plates, a dispersant, preferably in inkjet pigment formulations, an assistant in a tablet matrix, an assistant in the plasticizing of concrete, biodegradable polymers for, for example, materials for implants, surgical suture materials and garbage bags, water-soluble adhesives, adhesives for floor coverings, thickeners of aqueous or predominantly aqueous systems, sheets, moldings, foams and fibers, pressure-sensitive adhesive materials, solid or liquid adhesives, for producing self-cleaning surfaces of articles, as stain inhibitors in solid and liquid formulations, plastics used in automotive construction, in the household sector, for leisure articles, in the production of road signs, window profiles, lamp covers, garden furniture, boats, surfboards, toys, in the packaging sector, in the production of massage apparatuses and housings therefor, in the production of medical equipment, in the production of equipment for information processing and transmission, in the production of extensive wall elements, in transport containers, in housings for electrical equipment, in moldings for the construction sector or in grating covers comprising the step of mixing a reaction product (A) which is prepared by means of a process comprising the following stage (i):

(i) Reaction, under free radical conditions, of a reaction mixture comprising at least one monomer (a), capable of free radical reaction, in the presence of at least one radical of the formula (III)

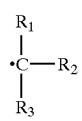
(III)

where $R_1$ to $R_3$, in each case independently of one another, are hydrogen, methyl or a radical-stabilizing and/or bulky group selected from the group consisting of unsubstituted and substituted, linear and branched alkyl groups having two or more carbon atoms, cycloalkyl, alcohol, ether, polyether, amine and aralkyl radicals, substituted and unsubstituted aromatic, heterocyclic and olefinic hydrocarbons, halogen atoms, a substituted and unsubstituted, linear and branched alkenyl and alkynyl groups, —C(O)R$_5$, —C(O)OR$_5$, —CR$_5$R$_6$—O—R$_7$, —O—C(O)R$_5$, —CN, —O—CN, —S—CN, —O—C=NR$_5$, —S—C=NR$_5$, —O—CR$_5$R$_6$—CR$_7$R$_8$NR$_9$R$_{10}$, —N=C=O, —C=NR$_5$, —CR$_5$R$_6$-Hal, —C(S)R$_5$, —CR$_5$R$_6$—P(O)R$_7$R$_8$, —CR$_5$R$_6$—PR$_7$R$_8$, —CR$_5$R$_6$—NR$_7$R$_8$, —CR$_5$R$_6$(OR$_7$)(OR$_8$), —CR$_5$R$_6$(OR$_7$)(NR$_8$), —CR$_5$R$_6$(NR$_7$)(NR$_8$), anhydride, acetal and ketal groups, —SO$_2$R$_5$, amidine groups, —NR$_5$C(S)NR$_6$, —NR$_5$C(S)—OR$_6$, —N=C=S, —NO$_2$, —C=N—OH, —N(R$_5$)=NR$_6$, —PR$_5$R$_6$R$_7$, —OSiR$_5$R$_6$R$_7$ and —SiR$_5$R$_6$R$_7$, where $R_5$ to $R_{10}$, independently of one another in each case, are defined in the same way as $R_1$ to $R_4$, or two of the radicals $R_1$ to $R_4$ form a $C_4$- to $C_7$-ring which in turn may be substituted or unsubstituted and, optionally, contain one or more heteroatom, with the proviso that at least two of the radicals $R_1$ to $R_3$ are a radical-stabilizing and/or bulky group as defined above or a polymer (B) which is prepared by a process comprising the stage (ii):

(ii) Reaction of the reaction product (A) obtained in stage (i), under free radical conditions, in the presence of at least one monomer (b) capable of free radical homopolymerization or copolymerization, with suitable additives.

23. The coating materials defined in claim 1, wherein the radical of the formula (III) is generated by cleavage of a compound of formula (I) or (II)

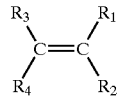
(I)

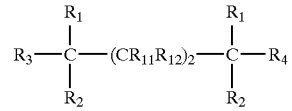
(II)

in which $R_1$ to $R_4$ and $R_{11}$ and $R_{12}$, in each case independently of one another, are hydrogen, methyl or a radical-stabilizing and/or bulky group defined in claim 8, and at least two of the radicals $R^1$ to $R^4$ in formula (I) and and at least two to the radicals $R^1$ to $R^4$ in formula (II) are radical-stabilizing and/or bulky groups.

24. The resin materials defined in claim 7, where the radical of the formula (III) is generated by cleavage of a compound of formulae (I) or (II)

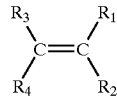
(I)

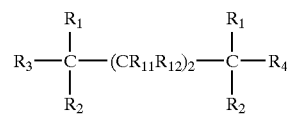
(II)

in which $R_1$ to $R_4$ and $R_{11}$ and $R_{12}$, in each case independently of one another, are hydrogen, methyl or a radical stabilizing and/or bulky group defined in claim 8, and at least two of the radicals $R^1$ to $R^4$ in formula (I) and and at least two of the radicals $R^1$ to $R^4$ in formula (II) are radical-stabilizing and/or bulky groups.

25. The aqueous dispersion defined in claim 13, wherein the radical of the formula (III) is generated by cleavage of a compound of formulae (I) or (II)

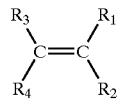
(I)

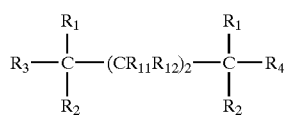
(II)
in which $R_1$ to $R_4$ and $R_{11}$ and $R_{12}$, in each case independently of one another, are hydrogen, methyl or a radical-stabilizing and/or bulky group defined in claim 8, and at least two of the radicals $R^1$ to $R^4$ in formula (I) and and at least two to the radicals $R^1$ to $R^4$ in formula (II) are radical-stabilizing and/or bulky groups.
* * * * *

UNITED STATES PATENT AND TRADEMARK OFFICE
CERTIFICATE OF CORRECTION

PATENT NO. : 7,008,990 B2
APPLICATION NO. : 10/311378
DATED : March 7, 2006
INVENTOR(S) : Raether et al.

Page 1 of 1

It is certified that error appears in the above-identified patent and that said Letters Patent is hereby corrected as shown below:

Claim 3: Column 40, line 65, "group" should read --groups--

Claim 9: Column 43, line 62, "and amine" should read --amine and--

Claim 12: Column 45, line 6, "presence low molecular" should read --presence of a low molecular--

Claim 13: Column 45, line 34, "a halogen atoms" should read --halogen atoms--

Claim 13: Column 45, line 52 - 53, "and, if required," should read --and, optionally,--

Claim 14: Column 46, line 16 - 17, "a halogen atoms, a substituted" should read --halogen atoms, substituted--

Signed and Sealed this

Tenth Day of April, 2007

JON W. DUDAS
*Director of the United States Patent and Trademark Office*